(12) United States Patent
Monma et al.

(10) Patent No.: US 9,080,737 B2
(45) Date of Patent: Jul. 14, 2015

(54) LIGHTING DEVICE FOR VEHICLE, AND MOUNTING STRUCTURE FOR THE DEVICE

(75) Inventors: Eikichi Monma, Wako (JP); Tasuku Sekine, Wako (JP); Shigeru Kodaira, Wako (JP); Hajime Soda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/001,681

(22) PCT Filed: Feb. 2, 2012

(86) PCT No.: PCT/JP2012/052408
§ 371 (c)(1),
(2), (4) Date: Aug. 27, 2013

(87) PCT Pub. No.: WO2012/120947
PCT Pub. Date: Sep. 13, 2012

(65) Prior Publication Data
US 2014/0003078 A1    Jan. 2, 2014

(30) Foreign Application Priority Data

Mar. 4, 2011 (JP) ................................. 2011-047046
Mar. 4, 2011 (JP) ................................. 2011-047048

(51) Int. Cl.
*F21S 8/10*    (2006.01)
*B62J 6/02*    (2006.01)
*B62J 17/02*    (2006.01)

(52) U.S. Cl.
CPC .. *F21S 48/00* (2013.01); *B62J 6/02* (2013.01); *B62J 17/02* (2013.01); *F21S 48/1104* (2013.01);

(Continued)

(58) Field of Classification Search
CPC ..... F21S 48/00; F21S 48/321; F21S 48/1159; F21S 48/328; B62J 17/02; B62J 6/02
USPC .................................................... 362/516, 297
See application file for complete search history.

(56) References Cited

U.S. PATENT DOCUMENTS

2009/0168428 A1    7/2009  Huang
2010/0246205 A1    9/2010  Tanaka et al.
2011/0280028 A1*  11/2011  Uchida ......................... 362/516

FOREIGN PATENT DOCUMENTS

EP    2 182 273 A2    5/2010
JP    11-238405 A     8/1999

(Continued)

OTHER PUBLICATIONS

International Search Report dated May 1, 2012 corresponding to International Patent Application No. PCT/JP2012/052408 and English translation thereof.

(Continued)

*Primary Examiner* — Anne Hines
(74) *Attorney, Agent, or Firm* — Squire Patton Boggs (US) LLP

(57) ABSTRACT

A lighting device for a vehicle has a base member and a lens. A light emitting diode and a reflector are housed in a space formed by the base member and the lens. The light emitting diode is disposed at a predetermined position on a support member extending into the space. The support member is provided with a wall which is located in front of and near the light emitting diode and which is higher than the light emitting diode. In a front view, the wall hides the light emitting diode and blocks light exiting directly from the light emitting diode without propagating through the reflector.

9 Claims, 19 Drawing Sheets

(52) U.S. Cl.
CPC .......... *F21S 48/1159* (2013.01); *F21S 48/321* (2013.01); *F21S 48/328* (2013.01); *F21S 48/1358* (2013.01)

(56) References Cited

FOREIGN PATENT DOCUMENTS

| | | |
|---|---|---|
| JP | 2007-035499 A | 2/2007 |
| JP | 2009-051404 A | 3/2009 |
| JP | 2009-067134 A | 4/2009 |
| JP | 2010-040322 A | 2/2010 |
| JP | 2010-125898 A | 6/2010 |
| JP | 2011-023375 A | 2/2011 |
| WO | 2009/063655 A1 | 5/2009 |

OTHER PUBLICATIONS

European Search Report dated Jan. 30, 2015, for corresponding European Patent Application No. 12754307.2.

\* cited by examiner

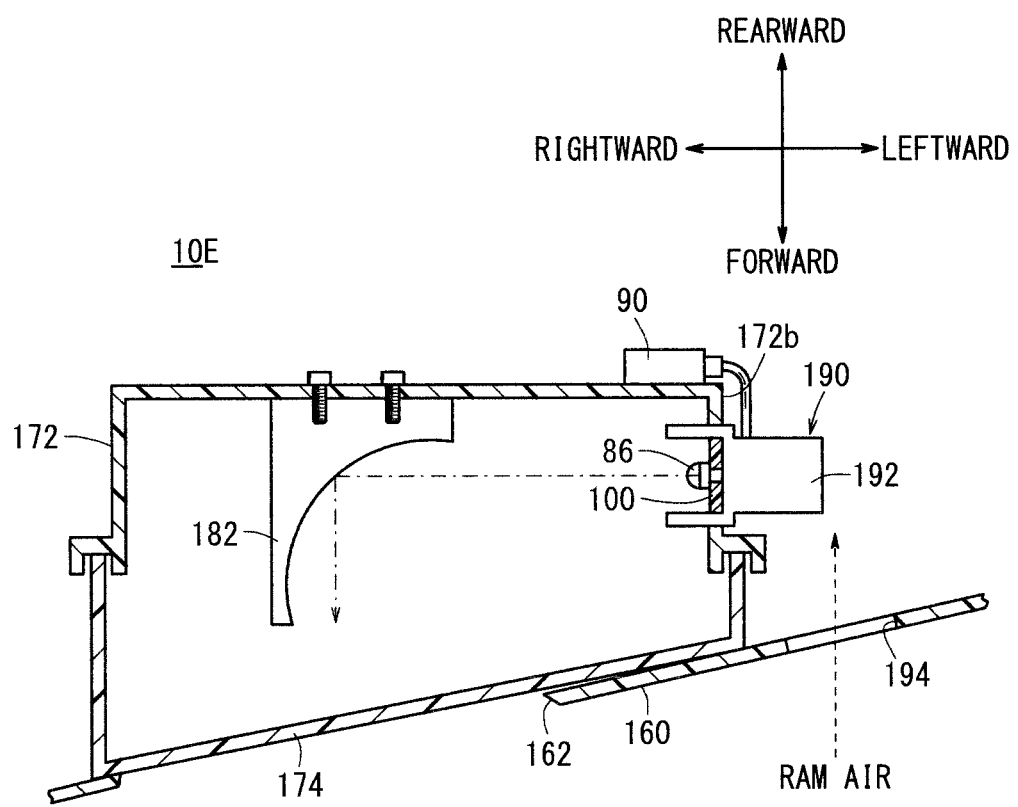

LIGHTING DEVICE FOR VEHICLE, AND MOUNTING STRUCTURE FOR THE DEVICE

TECHNICAL FIELD

The present invention relates to a lighting device for vehicles, which includes a light-emitting diode as a light source, as well as to a mounting structure for such a lighting device.

BACKGROUND ART

Heretofore, certain lighting devices for vehicles have the light source thereof concealed from view in order to improve the external visually perceived appearance (aesthetic appearance) of the lighting devices. Particularly in recent years, many lighting devices have incorporated a clear lens in view of the established technology for achieving light distribution with a shaped reflector rather than a cut lens. Since such a clear lens, which is included in the lighting device, tends to make the light source easily seen, there are demands for a structure that conceals the light source.

For example, Japanese Laid-Open Patent Publication No. 2009-051404 discloses a position lamp including a position bulb disposed in a base member and a lens disposed in front of the position bulb. The lens has an upper portion (overlapped portion) covered with a main pipe side cover (cover member). When the position lamp is viewed from the front, the cover member conceals the position bulb for improving the appearance of the position lamp. Light that is emitted from the position bulb is partially blocked by the cover member, which covers the overlapped portion of the lens. However, light is radiated outwardly through the visible portion of the lens, which is exposed below the cover member.

SUMMARY OF INVENTION

In contrast to position lamps, certain lighting devices, such as headlights, have a large light-emitting area. Lighting devices such as headlights are viewed externally not only from a frontal direction, but may be viewed from various angles. For example, such lighting devices may be viewed by pedestrians who bend over and look up obliquely from a lower position. In particular, since two-wheeled motor vehicles have the headlights thereof mounted higher than in four-wheeled motor vehicles, the cover member, which conceals the light source incorporated in the two-wheeled motor vehicle, may possibly allow an observer to see light emitted from the light source and which travels around the reflector, i.e., direct light, when the observer views the lighting device obliquely from a lower position.

If a light-emitting diode is used as a light source for a lighting device, then when the angle of orientation of the light-emitting diode and an angle of visual observation of an observer coincide with each other, the observer sees highly bright light as direct light from the light-emitting diode, which may possibly make the observer feel uncomfortable.

One solution would be to extend the cover member to a lower position on the lens in order to prevent the observer from seeing direct light from the light source. However, inasmuch as the cover member, if extended in this manner, would reduce the light-emitting area of the lighting device, it would be difficult for headlights in particular to achieve a desired light distribution in compliance with regulations. Another member may be attached to the cover member in order to block direct light. However, such an additional member leads to an increase in the number of parts, and makes the lighting device complex and poor in appearance.

The present invention has been made in view of the aforementioned problems. It is an object of the present invention to provide a lighting device for vehicles, as well as a mounting structure for the lighting device, which are simple in structure and are capable of preventing an observer from viewing a light-emitting diode directly, and from observing direct light that is emitted from the light-emitting diode over a wide range.

According to an invention recited in claim 1, there is provided a lighting device for a vehicle, comprising a base surrounded along an outer periphery thereof by a cover member of a vehicle body, a lens mounted on a front portion of the base and which is exposed through an opening defined in the cover member, and a light-emitting diode and a reflector which are housed in a space defined by the base and the lens, wherein the light-emitting diode is disposed in a predetermined position on a support assembly, which is supported on the base and extends into the space, and the support assembly includes a wall positioned forwardly of and in proximity to the predetermined position in which the light-emitting diode is disposed, the wall being disposed higher than the light-emitting diode, for limiting light that is emitted directly from the light-emitting diode.

According to an invention recited in claim 2, in the lighting device according to claim 1, the support assembly includes a cavity that houses the light-emitting diode therein, and the wall comprises a portion of an inner wall, which surrounds a peripheral side portion of the light-emitting diode in the cavity.

According to an invention recited in claim 3, in the lighting device according to claim 1, the base supports the light-emitting diode together with the support assembly in a downward facing manner, the reflector being disposed in a position confronting the light-emitting diode, and the wall being disposed at a height, such that a hypothetical straight line, which interconnects a center of the light-emitting diode and a tip end of the wall, passes through a front lower portion of the lens.

According to an invention recited in claim 4, in the lighting device according to claim 3, the reflector is curved from an upper end toward a lower end thereof, the lower end crossing the hypothetical straight line.

According to an invention recited in claim 5, in the lighting device according to claim 1, the support assembly comprises a board on which the light-emitting diode is mounted and a board support that supports the board, and the board support is made of a thermally conductive material, and is mounted on the base such that the board support supports the board on one surface thereof, and has another surface, which is opposite to the one surface, exposed through a mounting opening defined in the base.

According to an invention recited in claim 6, in a mounting structure for the lighting device according to claim 1, the cover member covers a portion of the lens, so as to conceal the light-emitting diode and the support assembly when the lighting device is viewed from the front.

According to an invention recited in claim 7, in the mounting structure for the lighting device according to claim 6, the base is disposed within the cover member, such that a surface of the support assembly on which the light-emitting diode is disposed faces obliquely rearward.

According to an invention recited in claim 8, in the mounting structure for the lighting device according to claim 6, the opening is shaped so as to be inclined obliquely upward in an outer transverse direction of the vehicle body, and the base supports the reflector and the support assembly, so as to be inclined obliquely upward in the outer transverse direction of the vehicle body, and at an angle of inclination of an upper end of the opening.

According to an invention recited in claim 9, in a mounting structure for the lighting device according to claim 5, heat-radiating fins, which are exposed out of the space, are disposed on the other surface of the board support, and the cover member includes a duct defined therein for guiding ram air that flows toward the heat radiating fins.

According to the invention recited in claim 1, since the support assembly has a wall positioned forwardly of and in proximity to the light-emitting diode, and is positioned higher than the light-emitting diode, the wall limits direct light from the light-emitting diode at a position closer to the light-emitting diode than the cover member. Thus, regardless of the shape of the cover member, the wall makes it possible to greatly increase a visual perception prevention range, in which direct light is prevented from being visually perceived (i.e., seen), while the wall also provides a sufficient light-emission area. Since the support assembly, which supports the light-emitting diode, includes the wall, it is easy to add the wall to the support assembly without requiring an increase in the number of parts.

According to the invention recited in claim 2, the light-emitting diode is housed in the cavity, which is defined in the support assembly. Thus, the light-emitting diode as well as direct light from the light-emitting diode is prevented from being seen over a wide range along lateral as well as frontal and oblique vertical directions.

According to the invention recited in claim 3, the hypothetical straight line, which interconnects the center of the light-emitting diode and the tip end of the wall, has a height that passes through a front lower portion of the lens. Consequently, above the hypothetical straight line, it is possible to radiate light reflected by the reflector and to block direct light emitted from the light-emitting diode. Consequently, the headlight is able to maintain a desired amount of radiated light, while at the same time reliably preventing direct light from being visually perceived.

According to the invention recited in claim 4, the lower end of the reflector crosses the hypothetical straight line. If the lighting device is seen from an angle that resides at least within a vertical angular range, the wall and the reflector are capable of blocking direct light emitted from the light-emitting diode, thereby making it possible to reliably prevent direct light from being seen.

According to the invention recited in claim 5, since the other surface of the board support, which is made of a thermally conductive material, is exposed through the mounting opening defined in the base, heat generated when the light-emitting diode emits light is radiated through the mounting opening. Consequently, thermally induced variations in operational characteristics of the light-emitting diode are reduced.

According to the invention recited in claim 6, the cover member covers a portion of the lens in order to conceal the light-emitting diode and the support assembly. Thus, the appearance of the lighting device as viewed from the front is improved.

According to the invention recited in claim 7, a surface of the support assembly on which the light-emitting diode is disposed faces obliquely rearward so as to increase the visual perception prevention range, and thereby more easily prevent direct light from the light-emitting diode from being seen.

According to the invention recited in claim 8, the reflector and the support assembly are supported so as to be inclined obliquely upward in an outer transverse direction of the vehicle body, and at an angle of inclination of an upper end of the opening. Accordingly, the reflector can be positioned efficiently with respect to the shape of the opening, while at the same time the light-emitting diode and the support assembly are concealed above the opening by the cover member. Therefore, the reflector can be reduced in size.

According to the invention recited in claim 9, ram air is guided in order to flow from the duct toward the heat radiating fins. Therefore, the support assembly can be cooled positively by the ram air, thereby facilitating radiation of heat, which is generated when the light-emitting diode emits light.

BRIEF DESCRIPTION OF DRAWINGS

FIG. 9 is a cross-sectional view, partially in plan, showing a lighting device according to a sixth embodiment and a mounting structure for the lighting device;

DESCRIPTION OF EMBODIMENTS

Lighting devices according to preferred embodiments (first through seventh embodiments) of the present invention will be described in detail below with reference to the accompanying drawings.

Figure 1:
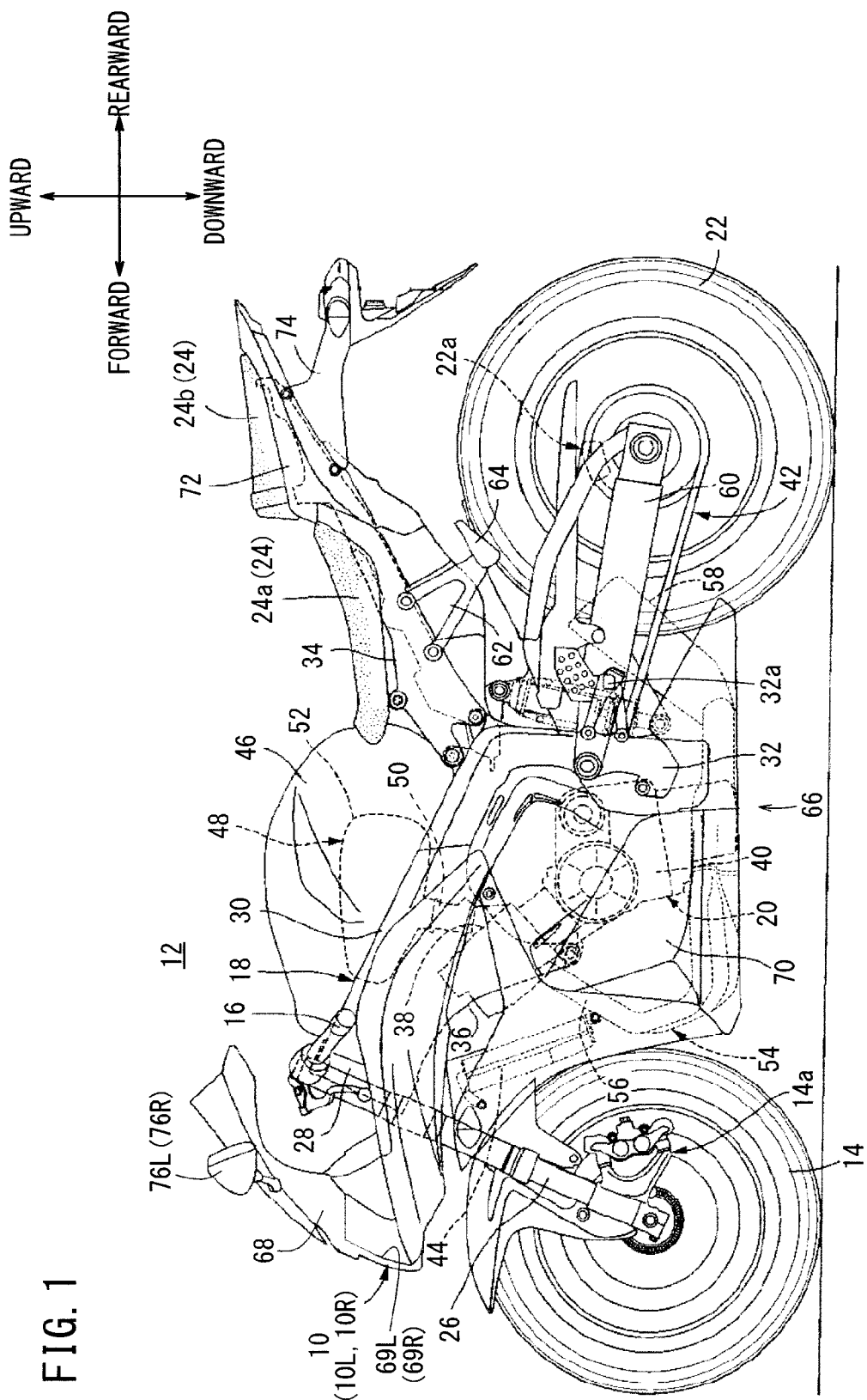
FIG. 1 is a side elevational view of a saddle-type two-wheeled motor vehicle, which incorporates a lighting device according to an embodiment of the present invention.

FIG. 1 is a side elevational view of a saddle-type two-wheeled motor vehicle (hereinafter also referred to as a "two-wheeled motor vehicle") 12 which incorporates therein a lighting device (headlight) 10 according to an embodiment of the present invention. In the description that follows, to facilitate description of the invention, a saddle-type two-wheeled motor vehicle 12 will be illustrated. However, the present invention is not limited to a saddle-type two-wheeled motor vehicle, but may also be applied to other types of two-wheeled motor vehicle such as engine-powered bicycles or the like. Mechanisms and components that are laterally symmetrically mounted, one on the left side and one on the right side of the two-wheeled motor vehicle 12, will be denoted by reference numerals together with the alphabetic characters "L" for components on the left side and "R" for components on the right side. To facilitate understanding of the present invention, forward, rearward, upward, and downward directions will be described below on the basis of the arrows shown in FIG. 1, unless otherwise indicated. Leftward and rightward directions (see the arrows in FIG. 2) will be described below on the basis of directions as seen from the perspective of a driver seated on the vehicle body.

As shown in FIG. 1, the two-wheeled motor vehicle includes a front wheel 14 that serves as a steerable wheel, a handle 16 for steering the front wheel 14, a vehicle frame assembly 18 that makes up the vehicle body, an engine 20 as a drive source, a rear wheel 22 that serves as a drive wheel, and a seat assembly 24 on which riders are seated.

The front wheel 14 is supported rotatably on a lower end of a front fork 26 that extends substantially vertically. A front wheel brake 14a is mounted on a lower portion of the front fork 26. The handle 16 is coupled to an upper end of the front fork 26. The front fork 26 has a substantially intermediate portion, which is angularly movably supported on a head pipe 28 disposed on the vehicle frame assembly 18.

The handle 16 extends symmetrically in leftward and rightward directions transverse to the two-wheeled motor vehicle 12 from a central portion that is coupled to the front fork 26. Grips to be gripped by the driver are mounted on respective opposite ends of the handle 16.

The vehicle frame assembly 18 comprises a so-called diamond frame assembly, for example, which is formed from a highly rigid aluminum-cast tube frame assembly with a reduced number of frames. The vehicle frame assembly 18 includes a pair of left and right main frames 30, which branch in left and right directions from the head pipe 28, extend obliquely downward and rearward, and then curve downward in a substantially intermediate region of the vehicle body, a pair of pivot plates 32 joined respectively to rear portions of the main frames 30 and which extend downward together with the main frames 30 in the substantially intermediate region of the vehicle body, and a pair of left and right seat rails 34 joined respectively to the main frames 30 in the substantially intermediate region of the vehicle body and which extend obliquely upward and rearwardly of the vehicle body.

An engine hanger 36, which is of a triangular shape as viewed in side elevation, extends downwardly from the main frames 30, and supports the engine 20 in a tilted posture. The engine 20 comprises a cylinder block 38 and a crankcase 40. An upper portion of a front end of the crankcase 40 is supported by the engine hanger 36, and a lower portion of a rear end of the crankcase 40 is supported by the pivot plates 32. With the crankcase 40 supported in this manner, the cylinder block 38 is fixed in place with its axis raised forwardly. The engine 20 may comprise an in-line four-cylinder engine, which is installed on the vehicle frame assembly 18.

The cylinder block 38 houses ignition plugs for burning fuel, and pistons for compressing an air-fuel mixture. The crankcase 40 houses a crankshaft, which is coupled to the pistons by connecting rods, and an engine output shaft. A clutch mechanism and a transmission, which serve as a power transmitting mechanism, are disposed between the crankshaft and the engine output shaft. Rotational drive forces from the engine 20 are transmitted from the engine output shaft in the crankcase 40 to an endless drive chain 42, which transmits rotational drive forces to the rear wheel 22.

A radiator 44 for radiating heat from the engine 20 is disposed in front of the cylinder block 38. The engine 20 is disposed below a fuel tank 46 and an intake device 48. The intake device 48 has an intake port 50 connected to a rear portion of the cylinder block 38, and an air cleaner 52 connected to an upstream end of the intake port 50. The air cleaner 52, which is covered by the fuel tank 46, attracts and removes dust or the like from air that is introduced from an intake hole (not shown) defined in a vehicle body cover 66. An exhaust device 54 is connected to a rear portion of the cylinder block 38. The exhaust device 54 includes plural exhaust pipes 56, which are connected respectively to the cylinders and extend downward from the cylinder block 38, and an exhaust muffler 58, which is joined to the exhaust pipes 56 and is disposed on the right side of the rear wheel 22.

A swing arm 60 has a front end, which is vertically swingably supported on the pivot plates 32 of the vehicle frame assembly 18. The swing arm 60 has a rear end on which the rear wheel 22 is rotatably supported. A rear wheel brake 22a is mounted on the rear end of the swing arm 60. Step holders 32a, on which the feet of the driver are placed, are mounted respectively on the pivot plates 32.

The seat assembly 24 on which riders (a driver and a pillion passenger) are seated is disposed on the seat rails 34. The seat assembly 24 comprises a so-called tandem seat assembly, including a front seat 24a for the driver and a rear seat 24b for the pillion passenger, with the rear seat 24b being positioned behind the front seat 24a. The seat assembly 24 is disposed above a storage box 62 in which various objects can be stored. Pillion steps 64, on which the feet of the pillion passenger who is seated on the rear seat 24b are placed, are disposed on intermediate portions of the seat rails 34.

The vehicle body cover 66 is mounted on the vehicle frame assembly 18 of the two-wheeled motor vehicle 12, thereby providing a design surface (appearance) for the vehicle body in the longitudinal direction of the vehicle body. The vehicle body cover 66 is made of a polymeric material such as acrylonitrile butadiene styrene (ABS), fiber-reinforced plastics (FRP), or polypropylene (PP).

The vehicle body cover 66 includes a front cowl (hereinafter referred to as a "cover member") 68 that covers a front portion of the head pipe 28, a pair of side cowls 70 covering both sides of the radiator 44 and the exhaust pipes 56 of the exhaust device 54, a rear cowl 72 disposed behind the rear end of the fuel tank 46 and below the cover member 68 and the seat assembly 24, and a rear fender 74, which is mounted on the seat rails 34 in covering relation to an upper portion of the rear wheel 22.

Figure 2:
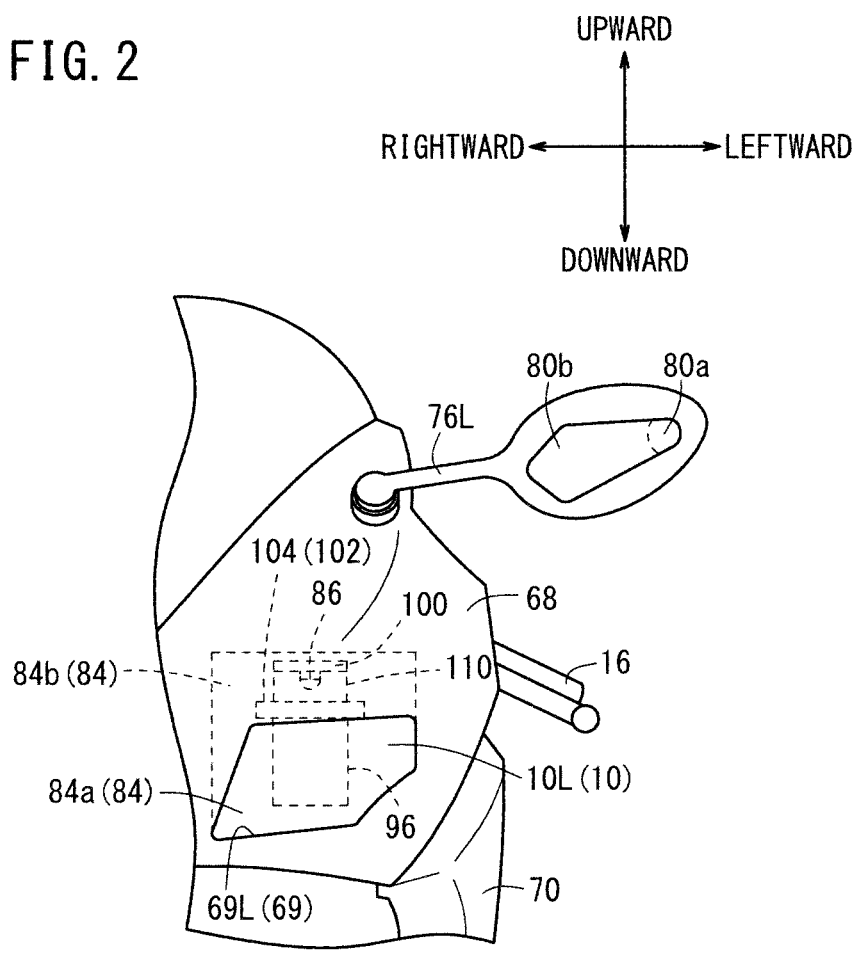
FIG. 2 is an enlarged front elevational view showing an upper left side of the two-wheeled motor vehicle shown in FIG. 1.

FIG. 2 is an enlarged front elevational view showing an upper left side of the two-wheeled motor vehicle 12 shown in FIG. 1. The cover member (front cowl) 68 has a streamlined design surface, which spreads gradually rearward from a distal central portion above the front wheel 14 and outwardly in a transverse direction of the motor vehicle, in order to reduce air resistance applied when the motor vehicle is running. A pair of left and right rearview mirrors 76L, 76R are mounted on upper portions of the cover member 68, and a pair of left and right headlights (lighting devices) 10L, 10R are mounted on lower portions of the cover member 68. The rearview mirrors 76L, 76R have respective mirror units (not shown) on surfaces thereof that face toward the driver. Each of the rearview mirrors 76L, 76R has a position lamp 80a and a winker lamp 80b on a reverse surface thereof.

The headlights 10L, 10R are disposed in the cover member 68 with lenses thereof exposed through respective openings 69L, 69R defined in the cover member 68 below the rearview mirrors 76L, 76R. Features of the headlights 10L, 10R according to first through six embodiments will be described in detail below. In the first through six embodiments, the left side headlight 10L as viewed from the perspective of the driver will be described in detail below, and the right side headlight 10R, which is symmetrically identical in structure to the headlight 10L, will not be described below (in the description below, the character "L", which is indicative the left side components, is omitted).

First Embodiment

Figure 3:
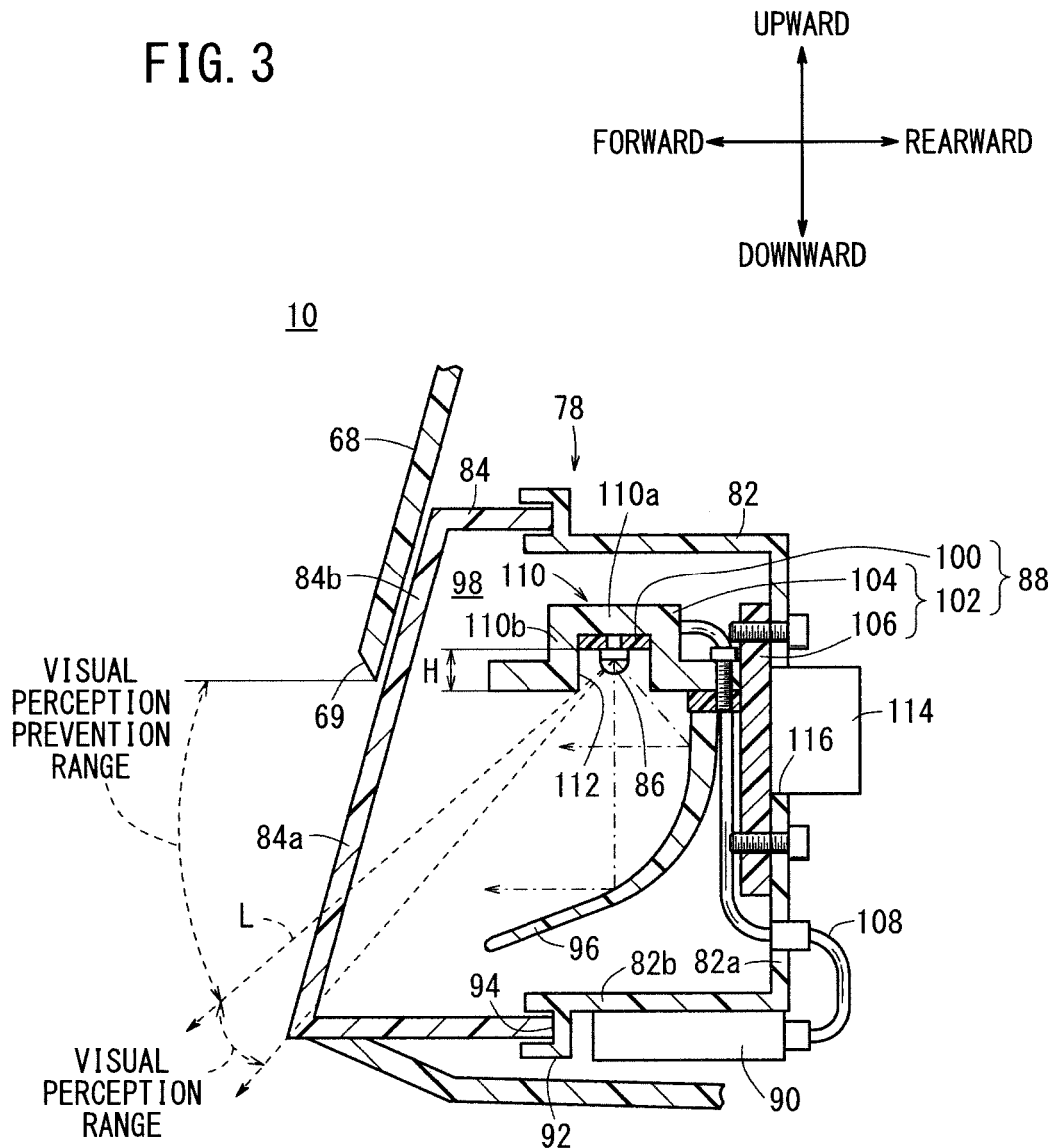
FIG. 3 is a cross-sectional view, partially in side elevation, showing a lighting device according to a first embodiment and a mounting structure for the lighting device.

FIG. 3 is a cross-sectional view, partially in side elevation, showing a headlight 10 according to a first embodiment and a mounting structure for the lighting device. The headlight 10 according to the first embodiment includes a base 82 and a lens 84. The headlight 10 with the base 82 and the lens 84 assembled together is disposed in the cover member 68. The headlight 10 includes a light-emitting diode (hereinafter referred to as an "LED") 86 as a light source.

The base 82 is made of a synthetic resin, which is capable withstanding a rise in temperature caused by light emitted from the LED 86. The synthetic resin preferably is a BMC (Bulk Molding Compound) or the like, for example.

The base 82 is in the form of a box having a concave cross-sectional shape with an open front end. The base 82 has a rear side wall 82a that faces toward the open front end. A support assembly 88 (second board support member 106) is fastened by screws to an inner surface of the rear side wall 82a. The base 82 further includes a side wall 82b surrounding the rear side wall 82a, and a drive unit (drive circuit) 90, which controls energization of the headlight 10, is mounted on an outer surface of the side wall 82b. The open front end of the base 82 has a flange 92, which projects outwardly from the box of the base 82. The flange 92 has a mounting groove 94 defined in a front face thereof, and which receives and accommodates therein an open rear end of the lens 84.

The lens 84 is made of a highly transparent synthetic resin and has a concave cross-sectional shape oriented opposite to the base 82. The lens 84 is assembled on the base 82 by hot melt, welding, or the like, with the open rear end fitted in the mounting groove 94. When the lens 84 and the base 82 are assembled together, the headlight 10 has an outer profile, which serves as a casing, with the lens 84 projecting a certain distance in front of the base 82. The lens 84 has a space 98 defined therein in which the support assembly 88, the LED 86, and a reflector 96 are accommodated.

The headlight 10 is constructed such that the lens 84 has an outer surface, which is greater than the opening 69 in the cover member 68. When the headlight 10 is disposed in the cover member 68 and hence is covered by the cover member 68, an upper portion of the lens 84 is covered by the cover member 68, which extends above the opening 69.

Light radiating components, i.e., the LED 86, the reflector 96, etc., which are housed in the headlight 10, are attached to the base 82 by the support assembly 88. The LED 86 comprises an LED capable of emitting an amount of light at a color temperature suitable for use as the light source of the headlight 10. In FIGS. 2 and 3, for purposes of illustration, only one LED 86 is shown as the light source of the headlight 10. Typically, however, the headlight 10 includes an array of LEDs 86 for emitting a desired amount of light at a desired color temperature.

The support assembly 88 includes a board 100 on which the LEDs 86 are mounted, a board support 102 made up of a first board support member 104 and a second board support member 106, which are mounted on the base 82 for supporting the board 100.

Insofar as the LEDs 86 are mounted on the board 100, the board 100 also supports thereon an electric circuit, which connects the LEDs 86 electrically to each other. The board 100 preferably is made of a highly thermally conductive material for transferring heat that is generated when the LEDs 86 emit light from the board 100 to the board support 102. The electric circuit on the board 100 includes input and output terminals, which are connected electrically to the drive unit 90 by a cable 108. When the driver turns on the headlight 10, the drive unit 90 supplies electric power to the LEDs 86 so as to enable the LEDs 86 to emit a desired amount of light.

In the same manner as the board 100, the board support 102 is made of a highly thermally conductive material. In addition to being highly thermally conductive, since the board support 102 is perceived visually from the exterior, the board support 102 may be made of a material such as aluminum, for example, having a color that is close to the color of the surface of the reflector 96.

The first board support member 104 is coupled to the second board support member 106, and extends in a substantially horizontal direction on an upper portion of the space 98 inside the headlight 10. The first board support member 104 has a cavity 110 defined in a lower surface thereof. The board 100 with the LEDs 86 mounted thereon is installed on a bottom portion 110a of the cavity 110. The LEDs 86 are disposed in the cavity 110 and face downwardly.

The cavity 110 has a depth from the flat surface of the first board support member 104, such that the LEDs 86 on the board 100 mounted in the cavity 110 are accommodated in the cavity 110 as viewed in side elevation. More specifically, the height H of a side 110b of the cavity 110, which surrounds the LEDs 86, is greater than the height of the LEDs 86 that project from the board 100. From among all of the sides of the cavity 110, the side 110b, which is positioned in front of the LEDs 86, functions as a wall 112 for limiting direct light emitted from the LEDs 86. Operations and advantages of the wall 112 will be described later.

The second board support member 106 is fastened by screws to the rear side wall 82a of the base 82. The first board support member 104 is coupled to a front surface (one surface) of the second board support member 106. The second board support member 106 includes heat radiating fins 114 on a surface thereof (other surface), which is opposite to the surface to which the first board support member 104 is coupled. When the second board support member 106 is installed on the base 82, the heat radiating fins 114 are inserted into a mounting opening 116, which is defined in the rear side wall 82a of the base 82, such that the heat radiating fins 114 project beyond an outer surface of the base 82. Thus, the second board support member 106 can be positioned easily on the base 82, so that the headlight 10 can be assembled in an efficient manner.

The reflector 96 has an upper end fastened by screws to a proximal end of the first board support member 104, and a lower end that extends into the space 98. The reflector 96 has a curved surface near a lower end thereof, which is disposed in a position facing toward the LEDs 86. The LEDs 86 are supported, in a downwardly facing orientation, on the first board support member 104. The reflector 96 is shaped as a curved surface, e.g., a quadric surface, which extends from the upper end toward the lower end of the reflector 96, for reflecting forwardly light emitted from the LEDs 86, which are disposed in the upper portion of the space 98. The surface of the reflector 96 may be coated with a thin film of aluminum by way of evaporation.

The headlight 10 is assembled into a unit by installing the LEDs 86, the support assembly 88 (the board 100 and the board support 102), and the reflector 96 on the base 82, and then attaching the lens 84 onto the front surface of the assembly. A mounting structure for the headlight 10, which is assembled as a unit together with the cover member 68, will be described below.

The headlight 10 is fixedly disposed in a certain position within the cover member 68, with the base 82 being mounted on the vehicle frame assembly 18 or the cover member 68. Since the light radiating components, i.e., the LEDs 86, the reflector 96, etc., are mounted on the base 82 by the support assembly 88, the optical axis of the headlight 10 can be set stably in position by securing the base 82 at a given angle.

With the headlight 10 disposed in the cover member 68, the lens 84 of the headlight 10 has a portion that is concealed by the cover member 68, and a remaining portion that is exposed outwardly. More specifically, as shown in FIGS. 2 and 3, the lens 84 has a lower end, which engages with an edge of the cover member 68 defining the lower end of the opening 69. The portion (appearance portion 84a) of the lens 84, which extends from the lower end up to a region of the lens 84 that is aligned with an edge of the cover member 68 defining the upper end of the opening 69, is exposed outwardly. The other portion (overlapped portion 84b) of the lens 84, which extends upwardly from the upper end of the opening 69, is overlapped and hence is covered by the cover member 68. Therefore, with the headlight 10 being disposed in the cover member 68, only the appearance portion 84a of the lens 84 is perceived visually.

The headlight 10 and the mounting structure for the headlight 10 according to the first embodiment are constructed basically as described above. Operations and advantages of the headlight 10 will be described below.

The headlight 10 includes the LEDs 86 and the board 100, which is supported by the first board support member 104 in an upper portion of the space 98, i.e., in a region aligned with the overlapped portion 84b of the lens 84 as viewed in front elevation. When the headlight 10 is viewed from the front while the headlight 10 is not energized, only the appearance portion 84a of the lens 84 is perceived visually through the opening 69 of the cover member 68. At this time, the LEDs 86, the board 100, and the first board support member 104 of the headlight 10 are concealed by the cover member 68 above the opening 69, and the second board support member 106 is concealed by the reflector 96, so that an observer can visually perceive only the reflector 96, which extends downwardly from the first board support member 104. Accordingly, when the observer views the headlight 10 from the front, the observer does not see the LEDs 86 and the board 100, and thus the headlight 10 has an improved appearance.

When the headlight 10 is energized, almost all of the rays of light emitted from the LEDs 86 travel straight to the reflector 96, which reflects the light forwardly of the motor vehicle. A portion of the forward-travelling rays of light emitted from the LEDs 86 are blocked by the wall 112, which is disposed in front of the LEDs 86. Therefore, when the observer views the headlight 10 from the front, the observer can visually perceive only rays of emitted light that are reflected by the reflector 96. Therefore, while the headlight 10 radiates light reflected by the reflector 96, the headlight 10 also blocks light emitted directly from the LEDs 86. Therefore, the headlight 10 is capable of maintaining a desired amount of radiated light, while at the same time preventing direct light from being perceived visually.

If the observer observes the headlight 10 from an obliquely lower position, then the observer is prevented from seeing the LEDs 86 by the wall 112. The range in which the observer is prevented from seeing the LEDs 86 is determined depending on the positional relationship between the LEDs 86 and the wall 112. More specifically, if the observer sees the headlight 10 in a range above a hypothetical straight line L, which interconnects the center of the LEDs 86 and the tip end of the wall 112, then since the LEDs 86 are concealed by the wall 112, the observer is prevented from seeing the LEDs 86.

If the observer sees the headlight 10 in a range below the hypothetical straight line L, then the observer sees the LEDs 86. However, the range in which the observer sees the LEDs 86 is sufficiently smaller than if the LEDs 86 were concealed by only the cover member 68. Since the front wheel 14 also exists in the range in which the observer can see the LEDs 86, the observer actually has a much smaller chance of seeing the LEDs 86. Consequently, the appearance of the headlight 10 is improved.

When the headlight 10 is energized, only rays of light that are emitted from the LEDs 86 and directed toward the range in which the observer can observe the LEDs 86 are emitted directly outward from the lens 84. In other words, rays of light that are directed toward the range (visual perception prevention range) above the hypothetical straight line L are blocked by the wall 112, whereas rays of light directed toward the range (visual perception range) below the hypothetical straight line L are allowed to leak outside of the lens 84. Consequently, the wall 112 is effective to significantly reduce the chances that the observer to will observe light emitted directly from the LEDs 86.

The headlight 10 according to the first embodiment includes the heat radiating fins 114, which are disposed on the rear surface of the second board support member 106. The heat radiating fins 114 radiate heat that is generated by the LEDs 86 when the LEDs 86 emit light. Such heat is transferred from the LEDs 86 through the board 100 and the first board support member 104 to the second board support member 106. The heat radiating fins 114 are disposed in proximity to the position where the first board support member 104 is coupled to the second board support member 106. Consequently, heat is smoothly transferred from the first board support member 104 through the second board support member 106 to the heat radiating fins 114. Since the heat radiating fins 114 project outwardly from the base 82, the heat radiating fins 114 radiate heat outside of the headlight 10. Consequently, the heat radiating fins 114 have an increased heat radiating capability. Since heat is radiated in this manner from the LEDs 86 and the support assembly 88, thermally induced variations in light emission characteristics of the LEDs 86 are reduced.

The heat radiating fins 114 on the second board support member 106 may be dispensed with, and the surface of the second board support member 106 may be exposed through the mounting opening 116 in the base 82, for thereby efficiently radiating heat that is generated by the LEDs 86 when the LEDs 86 emit light through the mounting opening 116. A duct, not shown, through which ram air is introduced, may be connected to the cover member 68 for guiding the introduced ram air toward the heat radiating fins 114 along the rear surface of the base 82. The ram air, which is guided in this manner, is capable of positively cooling the support assembly 88, thereby facilitating radiation of heat that is generated by the LEDs 86 when the LEDs 86 emit light.

Figure 4:
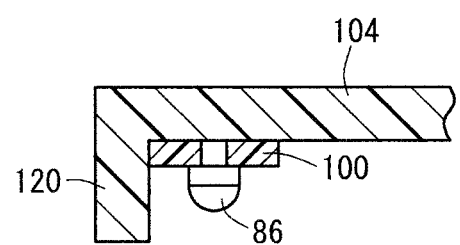
FIG. 4 is a cross-sectional view, partially in side elevation, showing a modification of a first board support member shown in FIG. 3.

FIG. 4 is a cross-sectional view, partially in side elevation, showing a modification of the first board support member 104 shown in FIG. 3. The headlight 10 may be constructed such that the first board support member 104 is devoid of the cavity 110 and includes a wall 120 that projects in front of the LEDs 86. The projecting wall 120 also is effective to prevent an observer from visually perceiving the LEDs 86 and direct light from the LEDs 86 when the observer views the headlight 10 obliquely from a lower position.

As described above, the headlight 10 according to the first embodiment has the support assembly 88, including the wall 112, 120, which is positioned higher than the LEDs 86 and is disposed in front of and in proximity to the LEDs 86. The wall 112, 120 limits direct light from the LEDs 86 at a position closer to the LEDs 86 than the cover member 68. Regardless of the shape of the cover member 68, the wall 112, 120 makes it possible to significantly increase the visual perception prevention range, in which direct light is prevented from being perceived visually, as well as to provide a sufficient light-emission area. Therefore, when the observer bends over and observes the headlight 10, the likelihood that the observer will feel uncomfortable due to direct light from the LEDs 86 is greatly reduced.

Since the support assembly 88, which supports the LEDs 86, includes the wall 112, 120, the wall 112, 120 can easily be added to the support assembly 88, which heretofore has been used to support the light source, without increasing the number of parts.

With the LEDs 86 accommodated in the cavity 110 that is defined in the support assembly 88, the observer is prevented from seeing the LEDs 86 as well as direct light from the LEDs 86 within a wide range along lateral directions, as well as frontal and obliquely vertical directions.

Second Embodiment

Figure 5:
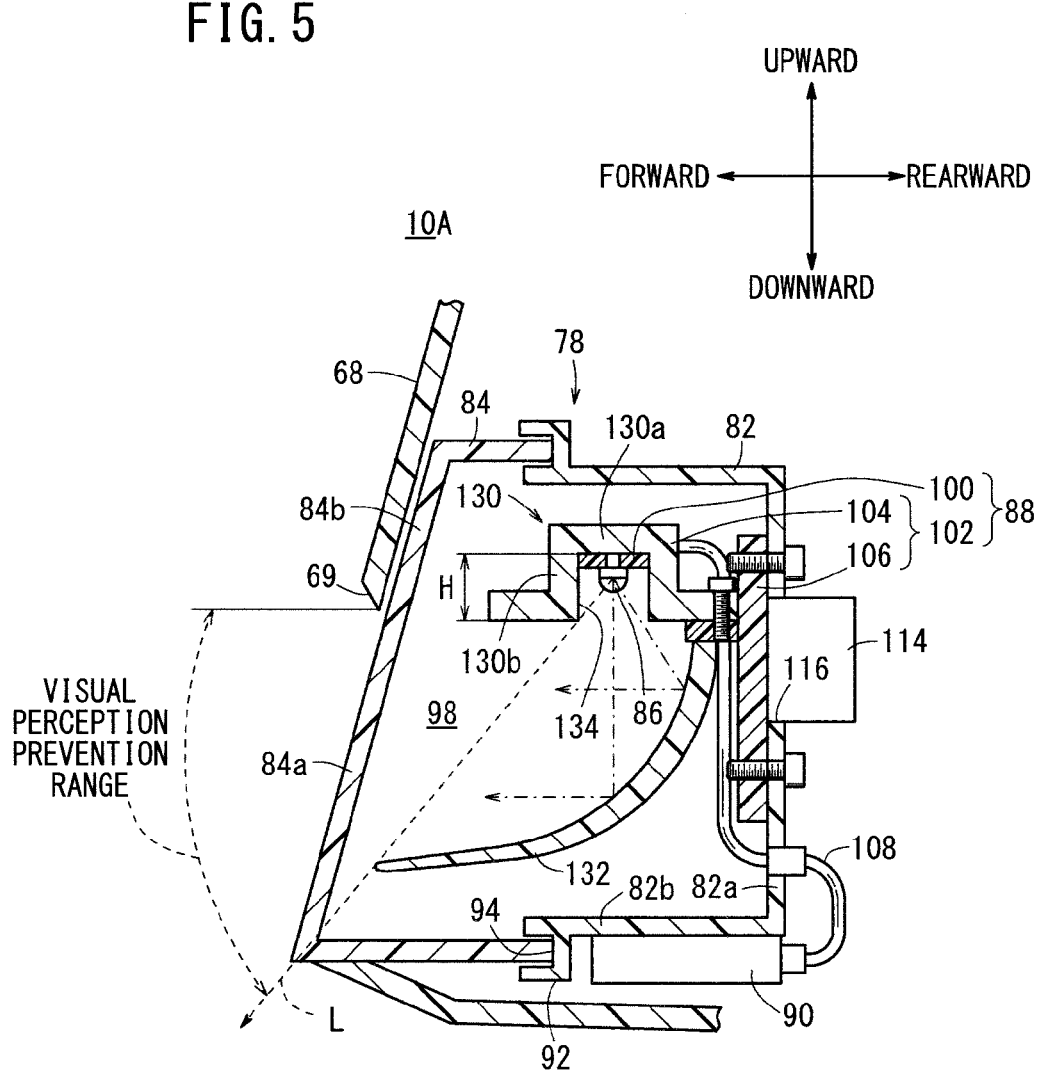
FIG. 5 is a cross-sectional view, partially in side elevation, showing a lighting device according to a second embodiment and a mounting structure for the lighting device.

FIG. 5 is a cross-sectional view, partially in side elevation, showing a headlight 10A according to a second embodiment and a mounting structure for the lighting device. In subsequent descriptions of the second through sixth embodiments, constituent parts, which are identical in structure and function in the same manner as those of the headlight 10 according to the first embodiment, will be denoted by identical reference characters, and such features will not be described in detail.

The headlight 10A according to the second embodiment differs from the headlight 10 according to the first embodiment in relation to the shape of a cavity 130 and a reflector 132. The bottom 130a of the cavity 130, which is defined in the first board support member 104, is deeper from the flat surface than the cavity 110 according to the first embodiment. The LEDs 86 and the board 100 are mounted on the bottom 130a of the cavity 130, such that a wall 134, which is positioned in front of the LEDs 86, has a greater height H. Therefore, with the headlight 10A according to the second embodiment, the hypothetical straight line L, which interconnects the center of the LEDs 86 and the tip end of the wall 134 positioned in front of the LEDs 86, is inclined more sharply than the hypothetical straight line L according to the first embodiment.

The reflector 132 according to the second embodiment has a greater curved surface than the reflector 96 according to the first embodiment. The reflector 132, an upper end of which is fastened to the first board support member 104, has a lower end that extends in a forward direction across the hypothetical straight line L.

Therefore, the appearance portion 84a of the headlight 10A is exposed through the opening 69 entirely within the visual perception prevention range. More specifically, if the observer observes the headlight 10A from above the hypothetical straight line L, the observer is prevented from seeing the LEDs 86 by the cavity 130 in the first board support member 104. On the other hand, if the observer observes the headlight 10A from below the hypothetical straight line L, the observer also is prevented from seeing the LEDs 86 by the reflector 132.

The shape of the cavity 130 and/or the reflector 132 should be designed such that the hypothetical straight line L and the lower end of the reflector 132 intersect each other.

According to the second embodiment, irrespective of the vertical direction in which the observer sees the headlight 10A, the wall 134 and the reflector 132 block direct light from the LEDs 86.

Third Embodiment

Figure 6:
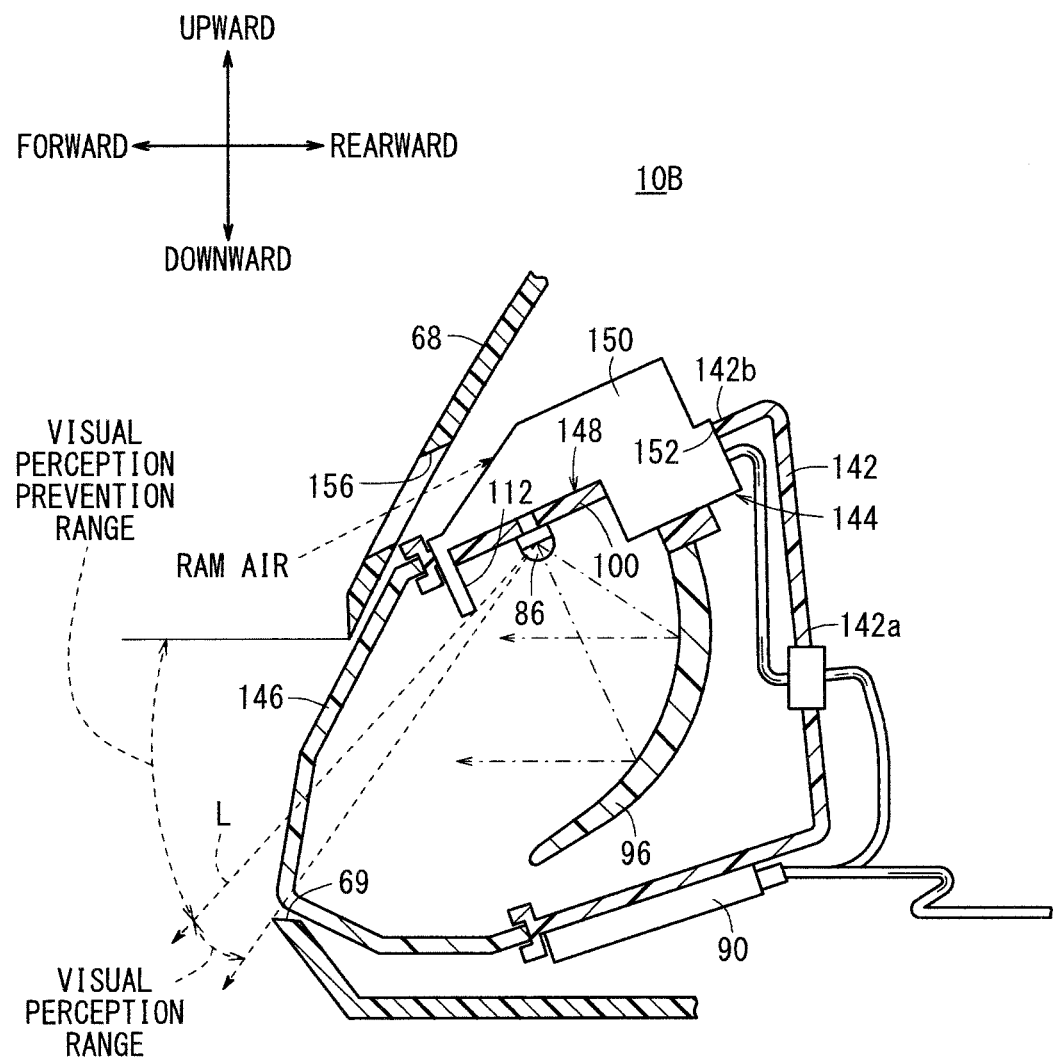
FIG. 6 is a cross-sectional view, partially in side elevation, showing a lighting device according to a third embodiment and a mounting structure for the lighting device.

FIG. 6 is a cross-sectional view, partially in side elevation, showing a headlight 10B according to a third embodiment and a mounting structure for the lighting device. The headlight 10B according to the third embodiment differs from the headlights 10, 10A according to the other embodiments, in that the headlight 10B is inclined obliquely downward with respect to the cover member 68. The headlight 10B includes a base 142 having a rear side wall 142a and an upper side wall 142b that are inclined obliquely downward with respect to the rear side wall 142a. A board support member 144 is mounted on the upper side wall 142b, which is inclined obliquely downward. A lens 146 is assembled on a front portion of the base 142. The lens 146 has a cross-sectional shape, which is defined in view of the inclination of the headlight 10B connected to the cover member 68.

The board support member 144 has a cavity 148 defined in a surface (lower surface) thereof, and heat radiating fins 150 disposed on an opposite surface (upper surface) of the board support member 144. The board 100 with the LEDs 86 mounted thereon is placed in the cavity 148. Since the board support member 144 is mounted on the inclined upper side wall 142b of the base 142, as described above, the board 100, which is disposed in the cavity 148, is supported so as to face obliquely rearward and downwardly. The LEDs 86 mounted on the board 100 also are disposed in the cavity 148 so as to face obliquely rearward and downwardly. The heat radiating fins 150 are inserted in a mounting opening 152 defined in the upper side wall 142b of the base 142, such that the heat radiating fins 150 project upwardly of the base 142.

The reflector 96, the upper end of which is connected to the board support member 144, is curved with a curved surface, which reflects in a forward direction the rays of light that are emitted obliquely rearward from the LEDs 86.

The cover member 68 with the headlight 10B disposed therein has a duct 156 defined above the opening 69. While the motor vehicle is traveling, the duct 156 introduces ram air from the front side of the cover member 68, such that the ram air is made to flow in the cover member 68.

If an observer sees the headlight 10B according to the third embodiment from an obliquely lower position, using a simpler structure, the observer also is prevented from seeing direct light from the LEDs 86. More specifically, with the headlight 10B mounted on the cover member 68, the LEDs 86 face in an oblique rearward direction, so that the hypothetical straight line L, which interconnects the center of the LEDs 86 and the tip end of the wall 112 positioned in front of the LEDs 86, is inclined further downward. Therefore, the visual perception prevention range provided by the wall 112, which prevents the observer from seeing the LEDs 86, is increased, thus making it possible to prevent the observer from seeing direct light from the LEDs 86 more reliably.

With the board support member 144 mounted on the base 142, the heat radiating fins 150, which are provided on the reverse side of the cavity 148, are disposed in an upper region of the headlight 10B. Accordingly, heat generated by the LEDs 86 is easily transferred upwardly (through the board 100 and the board support member 144) to the heat radiating fins 150, for thereby increasing heat radiating efficiency. Since the heat radiating fins 150 are disposed in an upper region of the headlight 10B, it is easier for ram air to be guided from the duct 156 in the cover member 68 to the heat radiating fins 150 than if the heat radiating fins 150 were disposed on the reverse side of the base 82 (as in the case of the headlights 10, 10A), thus making it possible to easily cool the heat radiating fins 150 with ram air. As a result, the heat radiating fins 150 are cooled effectively, resulting in an increase in efficiency at which heat is radiated from the LEDs 86, the board 100, and the board support member 144.

Fourth Embodiment

Figure 7:
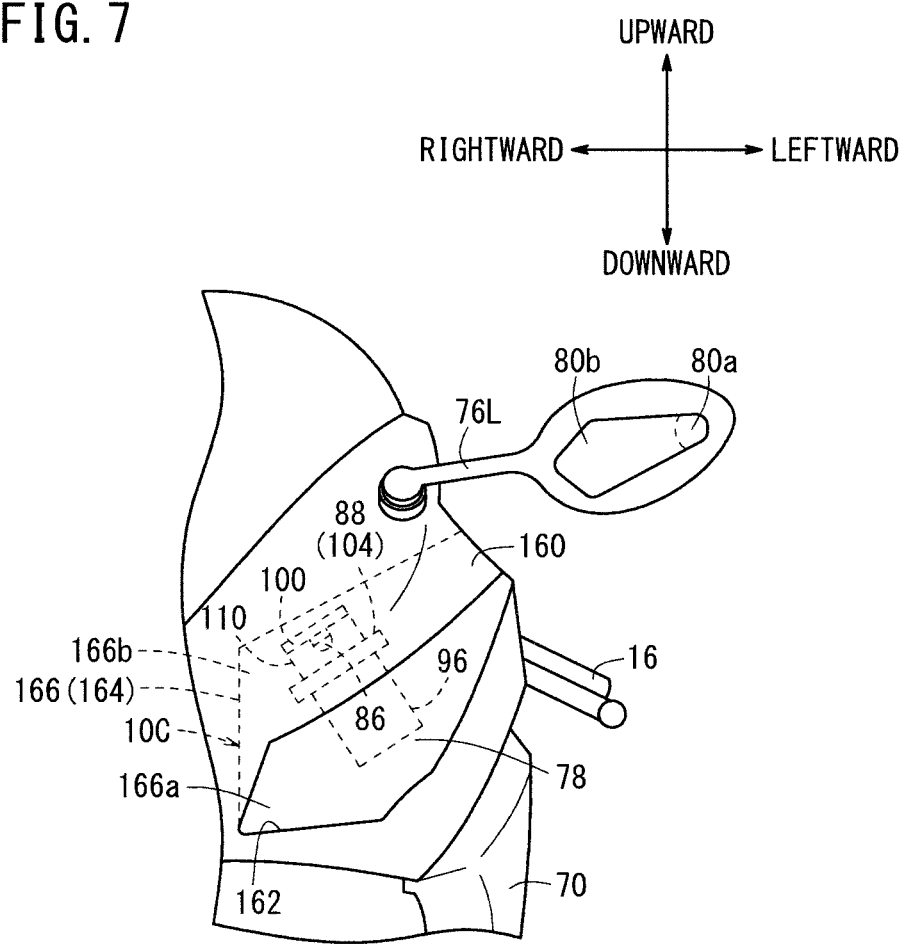
FIG. 7 is a fragmentary front elevational view of a lighting device according to a fourth embodiment and a mounting structure for the lighting device.

FIG. 7 is a fragmentary front elevational view of a headlight 10C according to a fourth embodiment and a mounting structure for the lighting device. The headlight 10C according to the fourth embodiment differs from the headlights 10, 10A, 10B according to the other embodiments, in that an opening 162, which is defined in a cover member 160, is inclined obliquely upward and outwardly in a transverse direction of the motor vehicle. The headlight 10C has a base 164 and a lens 166, which are molded so with to engage in the opening 162 and be disposed within the cover member 160. More specifically, the lens 166 of the headlight 10C has an appearance portion 166a, which is inclined obliquely upward to the left along the opening 162, and an overlapped portion 166b, which extends into the cover member 160 along an upper end of the opening 162.

The base 164 has an open end that engages with a rear open end of the lens 166. The base 164 supports the reflector 96 and the support assembly 88 (the board 100 and the board support 102) so as to be inclined obliquely upward and outwardly in a transverse direction of the motor vehicle, along the angle of inclination of the upper end of the opening 162. The reflector 96 and the first board support member 104 are mounted on the base 164 at a given angle of inclination, which is equal to the angle of inclination of the opening 162, about the center of a tip end of the vehicle body when the headlight 10C is viewed from the front. Therefore, the board 100, which is mounted on the first board support member 104, also is inclined as viewed from the front.

Insofar as the base 164 supports the first board support member 104 obliquely, the cover member 160 above the opening 162 covers the LEDs 86 and the support assembly 88, and the reflector 96 is disposed efficiently in relation to the shape of the opening 162. More specifically, since the base 164 has the LEDs 86 and the reflector 96 inclined in a similar manner, light emitted from the LEDs 86 and which is applied to the reflector 96 is reflected reliably in a forward direction. With the opening 162 inclined in this manner, therefore, the reflector 96, which also is inclined, may be smaller in size than if the reflector 96 were disposed in a substantially horizontal orientation.

If the observer views the headlight 10 from an oblique lower position, the observer is prevented from seeing the LEDs 86 as well as direct light from the LEDs 86 as a result of the cavity 110 (wall 112), which is defined in the first board support member 104, in the same manner as the headlights 10, 10A, 10B.

Fifth Embodiment

Figure 8A:
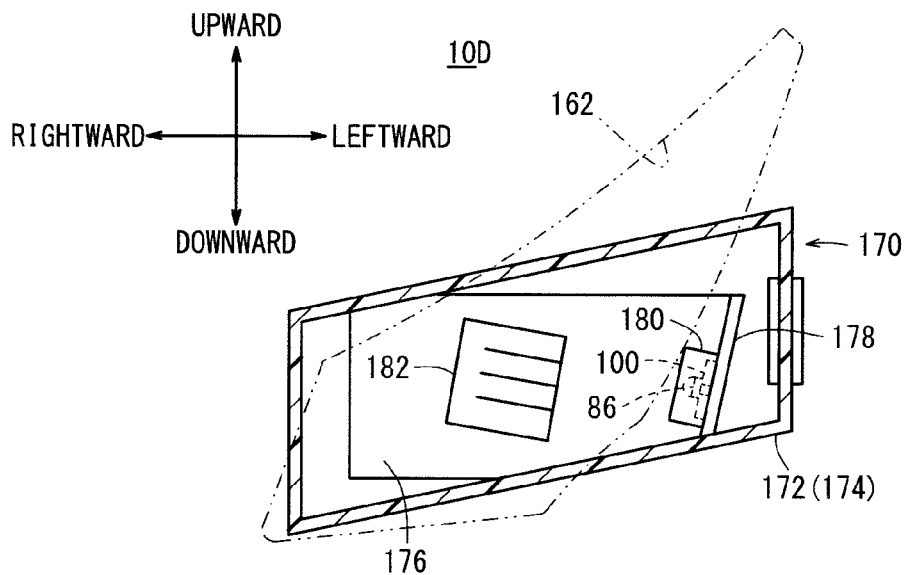
FIG. 8A is a cross-sectional view, partially in front elevation, showing a lighting device according to a fifth embodiment and a mounting structure for the lighting device.
Figure 8B:
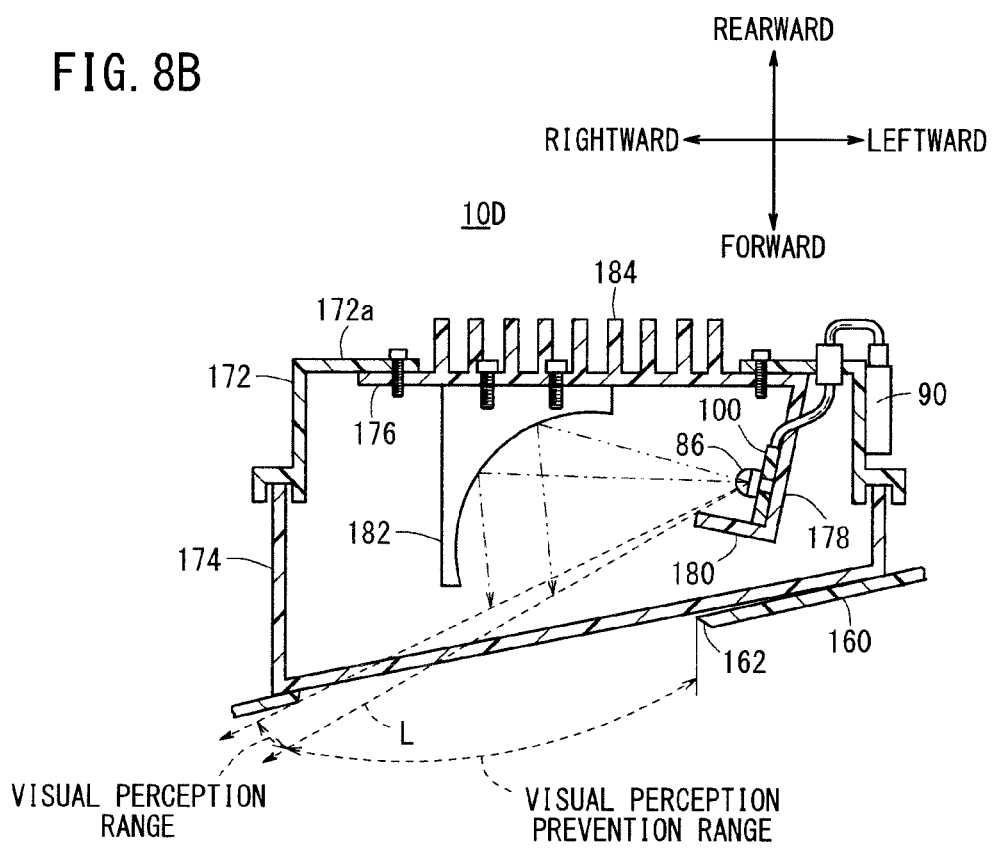
FIG. 8B is a cross-sectional view, partially in plan, showing the lighting device according to the fifth embodiment and the mounting structure for the lighting device.

FIG. 8A is a cross-sectional view, partially in front elevation, showing a lighting device according to a fifth embodiment and a mounting structure for the lighting device. FIG. 8B is a cross-sectional view, partially in plan, showing the lighting device according to the fifth embodiment and the mounting structure for the lighting device. The lighting device, i.e., a headlight 10D, according to the fifth embodiment differs from the headlights 10, 10A, 10B, 10C according to the other embodiments, in that the light source (LEDs 86) of the headlight 10D is disposed on a side surface of a base 172, with respect to the opening 162 according to the fourth embodiment.

The base 172 and a lens 174 are shaped in the form of a parallelogram as viewed in front elevation (see FIG. 8A), and have a substantially concave cross-sectional shape as viewed in plan (see FIG. 8B). The base 172 has a rear side wall 172a with a board support member 176 attached thereto. The board support member 176 has an end portion, which is bent into an extension 178 that extends obliquely forward as viewed in plan. The board 100 with the LEDs 86 mounted thereon is mounted on an inner surface of the extension 178. The extension 178 includes an inwardly projecting wall 180 on a front end thereof. The wall 180 is positioned higher than the LEDs 86 in the forward direction of the wall 180.

A reflector 182 is mounted on the board support member 176 and is laterally curved in facing relation to the LEDs 86, which are disposed on the extension 178. Rays of light emitted from the LEDs 86 are reflected by the reflector 182 and are radiated forwardly of the headlight 10D.

Heat radiating fins 184 are integrally disposed on the surface of the board support member 176, which is opposite to the surface from which the extension 178 projects. Heat generated when the LEDs 86 emit light is transferred through the extension 178 and the board support member 176 to the heat radiating fins 184, which radiate the heat.

With the headlight 10D disposed in the cover member 160, the side portion (extension 178) where the LEDs 86 are disposed is concealed. Therefore, if an observer sees the headlight 10D from the front, the observer is prevented from seeing the LEDs 86 and the extension 178. Further, if an observer sees the headlight 10D from an obliquely lateral direction, then since rays of light directed in a range (visual perception prevention range) on the left side of the hypothetical straight line L interconnecting the center of the LEDs 86 and the tip end of a wall 180 are blocked by the wall 180, the observer has a much smaller chance of laterally observing direct light emitted from the LEDs 86 on account of the wall 180.

Sixth Embodiment

FIG. 9 is a cross-sectional view, partially in plan, showing a headlight 10E according to a sixth embodiment and a mounting structure for the lighting device. The headlight 10E according to the sixth embodiment differs from the headlights 10, 10A, 10B, 10C, 10D according to the other embodiments, in that a board support member 190 is mounted on a side wall 172b of the base 172. The board support member 190 includes heat radiating fins 192 on a surface thereof opposite to the surface on which the board 100 is disposed. With the board support member 190 mounted on the base 172, the heat radiating fins 192 project sidewise from the base 172. The cover member 160 has a duct 194 defined therein at a position confronting the heat radiating fins 192, i.e., laterally of the opening 162. The duct 194 introduces ram air into the cover member 160 while the motor vehicle is running. With the headlight 10D constructed in this manner, ram air is introduced toward the heat radiating fins 192 from the duct 194 for thereby increasing the efficiency at which heat is radiated from the board support member 190.

REFERENCE EXAMPLE

Headlights (lighting devices) for two-wheeled motor vehicles may be arranged to provide two light distribution patterns, including a low beam for irradiating a relatively wide zone positioned obliquely downward of the vehicle body, and a high beam for irradiating a relatively narrow zone positioned in front of the low beam. The headlights preferably are constructed in view of thermal effects in addition to the light distribution patterns including the low beam and the high beam. A headlight for motor vehicles, which is of a simple structure and is capable of applying a low beam and a high beam as well as easily radiating generated heat when light-emitting diodes emit light, for thereby stably applying the low beam and the high beam, will be described below together with a mounting structure for mounting the headlight.

Figure 10:
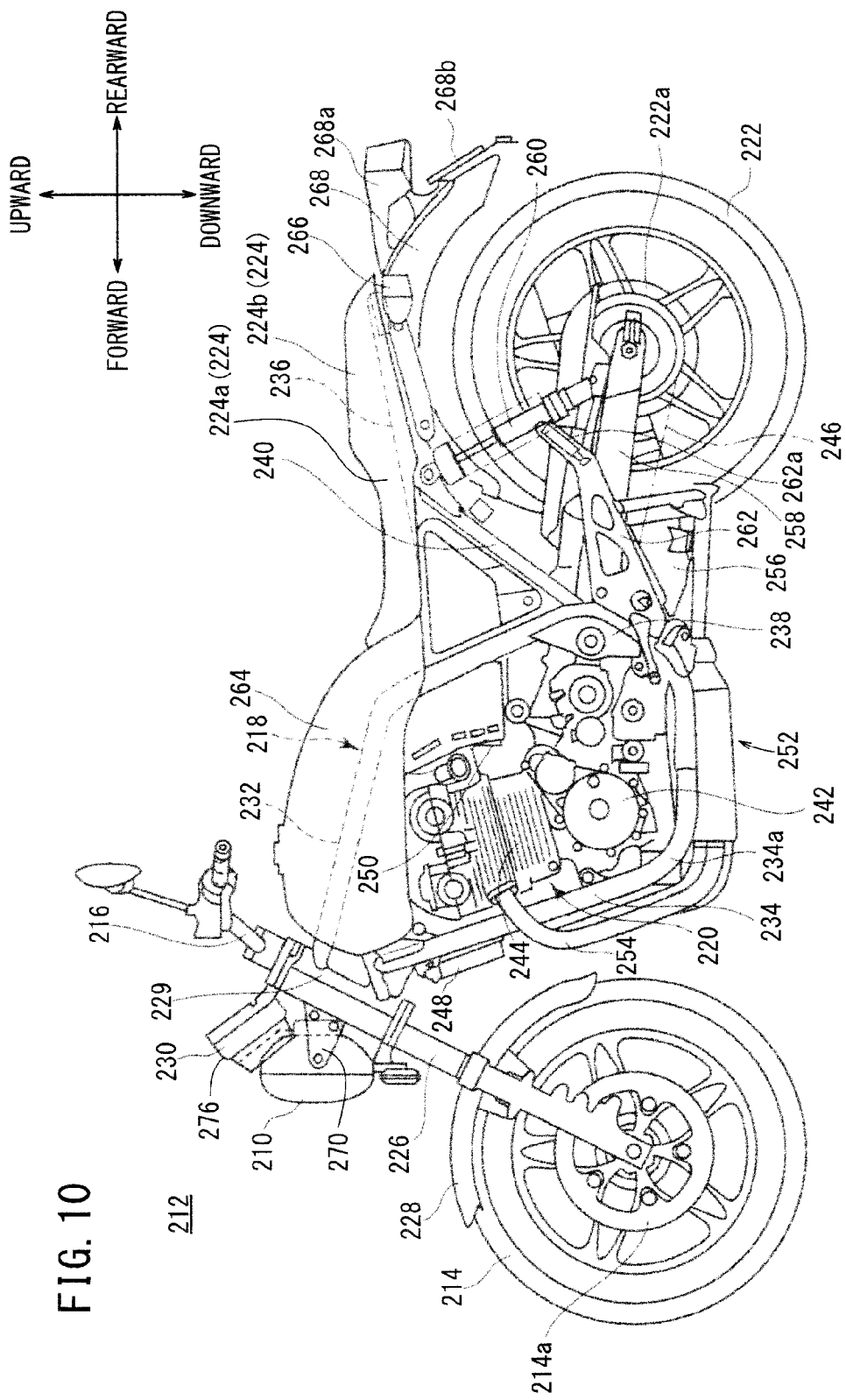
FIG. 10 is a side elevational view of a saddle-type two-wheeled motor vehicle, which incorporates a lighting device according to a reference example.

FIG. 10 is a side elevational view of a saddle-type two-wheeled motor vehicle 212, which incorporates a headlight 210 according to the reference example. Similar to the headlight 10 according to the first embodiment, mechanisms or components, which are laterally symmetrically mounted, one on the left side and one on the right side, of the two-wheeled motor vehicle 212, will be denoted by reference numerals together with the character "L" to designate components on the left side, and with the character "R" to designate components on the right side. Forward, rearward, upward, and downward directions will be described below on the basis of the arrows shown in FIG. 10, unless otherwise indicated. Leftward and rightward directions (see the arrows in FIG. 11) will be described below on the basis of directions as seen from the perspective of a driver seated on the vehicle body.

As shown in FIG. 10, the two-wheeled motor vehicle 212 includes a front wheel 214 that serves as a steerable wheel, a handle 216 for steering the front wheel 214, a vehicle frame assembly 218 that makes up the vehicle body, an engine 220 as a drive source, a rear wheel 222 that serves as a drive wheel, and a seat assembly 224 on which riders are seated.

The front wheel 214 is rotatably supported on the lower end of a front fork 226, which extends substantially vertically. A front wheel brake disk 214a is mounted on a side portion of the front wheel 214, and an arcuate front fender 228 is disposed over an upper portion of the front wheel 214. The handle 216 is coupled to the upper end of the front fork 226. The front fork 226 has a substantially intermediate portion, which is angularly movably supported on a head pipe 229 disposed on a front end of the vehicle frame assembly 218. A headlight 210 and a meter unit 230 housing meters therein are mounted on an upper portion of the front fork 226.

The handle 216 extends symmetrically leftward and rightward in transverse directions of the two-wheeled motor vehicle 212, from a central portion of the two-wheeled motor vehicle 212 that is coupled to the front fork 226. Grips, which are gripped by the driver, are mounted on the respective opposite ends of the handle 216.

The vehicle frame assembly 218 comprises a so-called double-cradle frame assembly, which is in the form of a highly rigid aluminum-cast tube frame assembly, for example. The vehicle frame assembly 218 includes a pair of left and right main frames 232, which branch to the left and right from the head pipe 229 and extend gradually obliquely downward and rearwardly, and then are curved downward at a substantially intermediate region of the vehicle body, a pair of down pipes 234, which branch to the left and right from front ends of the main frames 232 and extend obliquely downward below the main frames 232, and then rearwardly and substantially horizontally through curved portions 234a, a pair of left and right seat rails 236, which are joined respectively to the main frames 232 in a substantially intermediate region of the vehicle body, and which extend obliquely upward and rearwardly, a pair of pivot plates 238 disposed respectively on lower portions of the main frames 232, and a pair of left and right reinforcing stays 240, which extend obliquely upward and rearwardly from the pivot plates 238 and are connected to the seat rails 236.

An engine 220 is disposed behind the front wheel 214 and between the main frames 232 and the down pipes 234. The engine 220 may comprise an in-line four-cylinder engine. The engine 220 has a crankcase 242, which is fixed to lower portions of the main frames 232, and a cylinder block 244, which is coupled to a front upper portion of the crankcase 242.

The cylinder block 244 houses therein ignition plugs for burning fuel, and pistons for compressing an air-fuel mixture. The crankcase 242 houses therein a crankshaft, which is coupled to the pistons by connecting rods, an engine output shaft, and a clutch mechanism and a transmission that serve as a power transmitting mechanism, and which are disposed between the crankshaft and the engine output shaft. Rotational drive forces from the engine 20 are transmitted from the engine output shaft in the crankcase 242 to an endless drive chain 246, which transmits the rotational drive forces to the rear wheel 222.

A radiator 248 for radiating heat from the engine 220 is disposed in front of the cylinder block 244. An intake device (air cleaner 250) is disposed behind the cylinder block 244. An exhaust device 252 is connected to the cylinder block 244. The exhaust device 252 has a plurality of exhaust pipes 254 connected respectively to the cylinders, and which extend downwardly from a front portion of the engine 220, and an exhaust muffler 256 joined to the exhaust pipes 254, and which extends rearwardly from a lower portion of the vehicle frame assembly 218 on the right side of the vehicle body.

A swing arm 258 has a front end vertically and swingably supported on the pivot plates 238 of the vehicle frame assembly 218. A rear cushion 260 is interposed between an upper portion of the rear end of the swing arm 258 and the seat rail 236. The rear wheel 222 is rotatably supported on the rear end of the swing arm 258, and a rear wheel brake disk 222a also is mounted on the rear end of the swing arm 258. Rearwardly extending pillion steps 262 are fixed to the pivot plates 238, and step holders 262a, on which the feet of the driver and a pillion passenger are placed, are mounted respectively on the pillion steps 262.

A fuel tank 264 is disposed over and across upper portions of the main frames 232. A seat assembly 224 on which riders (a driver and a pillion passenger) are seated is disposed on upper portions of the seat rails 236 behind the fuel tank 264. The seat assembly 224 comprises a so-called tandem seat assembly, including a front seat 224a on which the driver is seated and a rear seat 224b on which the pillion passenger is seated, with the rear seat 224b being positioned behind the front seat 224a.

Rear winkers 266 are mounted on rear portions of the seat rails 236, and a rear fender 268, which has a substantially arcuate shape as viewed in side elevation, also is mounted on rear portions of the seat rails 236. A tail lamp 268a and a license plate 268b are attached respectively to the rear fender 268.

Figure 11:
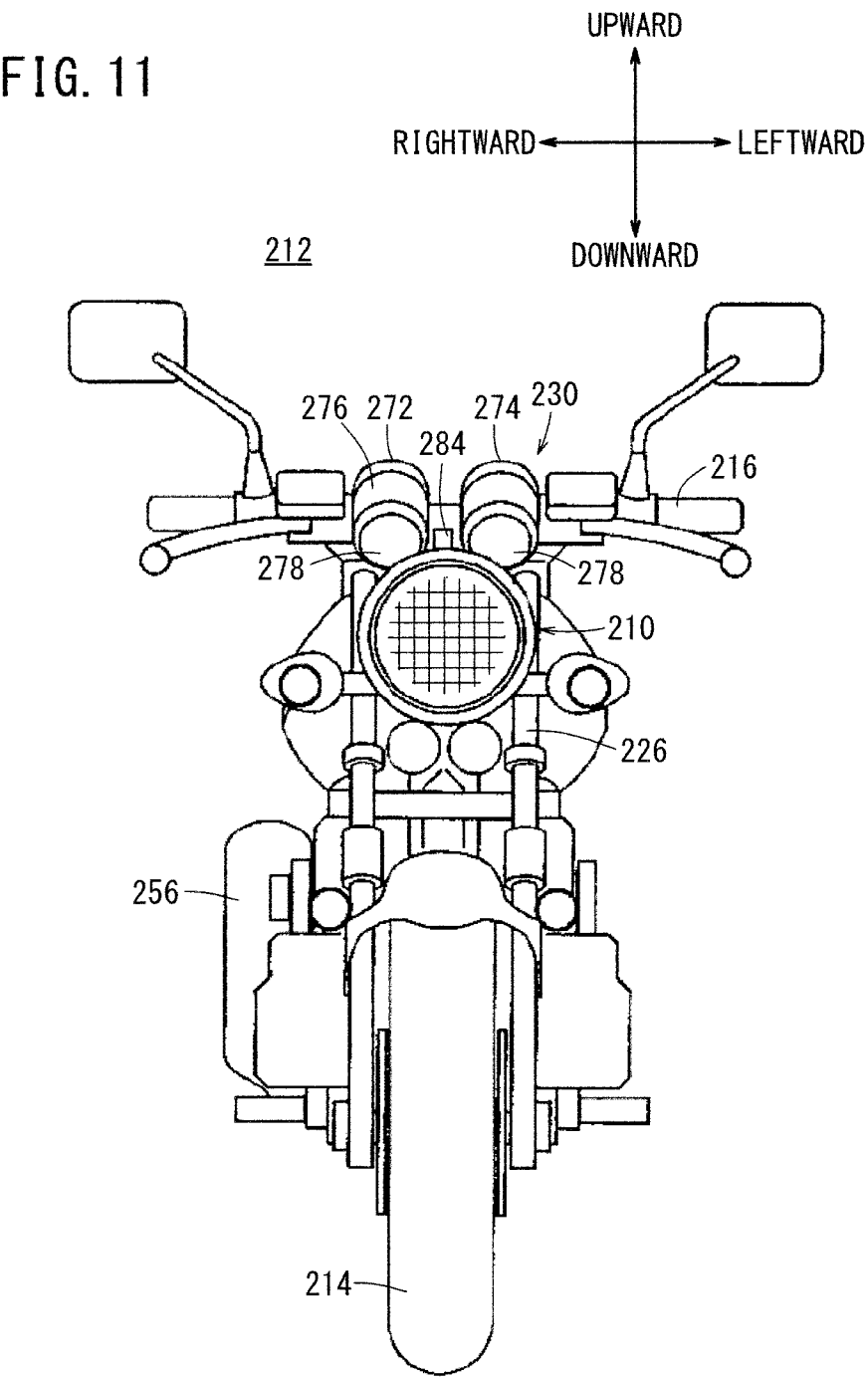
FIG. 11 is a front elevational view of the two-wheeled motor vehicle shown in FIG. 10.
Figure 12:
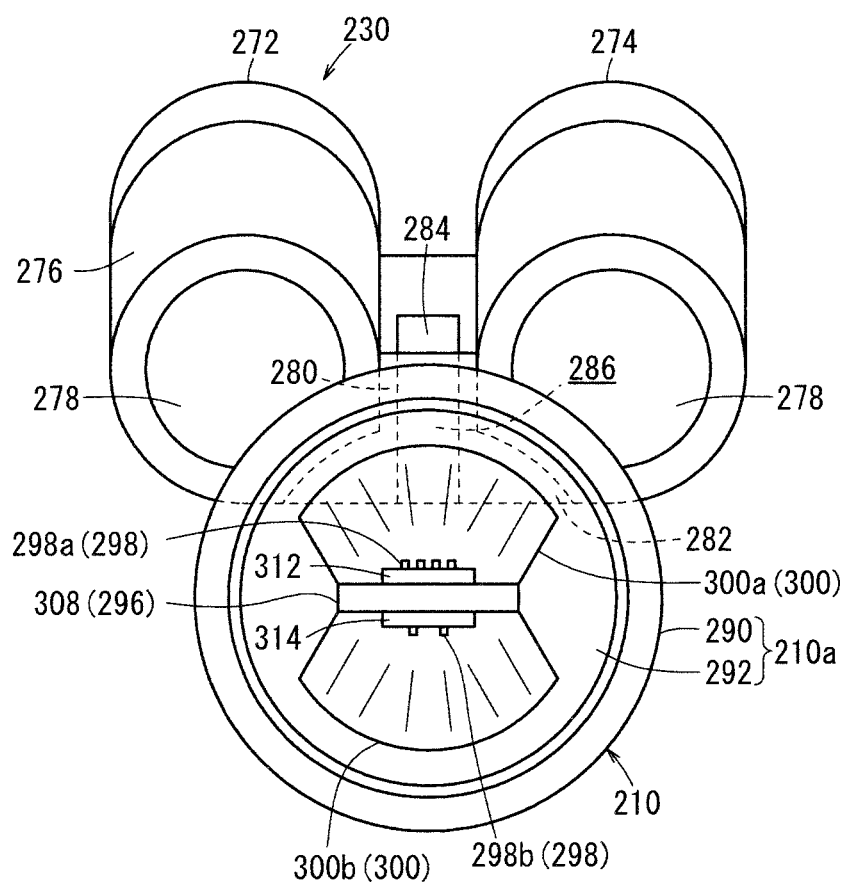
FIG. 12 is an enlarged front elevational view of the lighting device shown in FIG. 10 and a mounting structure for the lighting device.

The headlight 210 of the two-wheeled motor vehicle 212 according to the reference example and a mounting structure for the headlight 210 will be described in specific detail below. FIG. 11 is a front elevational view of the two-wheeled motor vehicle 212 shown in FIG. 10, and FIG. 12 is an enlarged front elevational view of the headlight 210 shown in FIG. 10 together with a mounting structure for the headlight 210. As shown in FIG. 11, the headlight 210 is provided as a single head lamp, which is mounted on the front fork 226 that extends vertically over the front wheel 214. After the headlight 210 has been assembled as a single unit, the headlight 210 is installed on the front fork 226 by attachments 270 (see FIG. 10), so as to be sandwiched between the fork members of the front fork 226. As shown in FIGS. 10 and 11, the headlight 210 is fixed to an upper portion of the front fork 226 in engagement with the meter unit 230. However, the meter unit 230 and the headlight 210 need not necessarily be held in engagement with each other, insofar as the meter unit 230 and the headlight 210 are in a partially overlapping positional relationship when the motor vehicle is viewed in side elevation.

The meter unit 230 according to the reference example includes a speedometer 272 and a tachometer 274 on an upper surface thereof facing toward the driver. The speedometer 272 and the tachometer 274 are arrayed along a transverse direction of the motor vehicle, and are disposed in laterally symmetrical positions with respect to the central axis of the vehicle body. The two meters 272, 274 are housed in a cover member 276 such that only the instrument indicator surfaces thereof are exposed.

The cover member 276 of the meter unit 230 has a thickness, which is sufficiently large to house the two meters 272, 274, which are movement type meters. The cover member 276 has, on a lower surface thereof, two bulging domes 278 in which the speedometer 272 and the tachometer 274 are disposed, and a bridge 280 that is sandwiched between the two domes 278. The domes 278 and the bridge 280 are joined to each other as a joint structure, which partially includes an arcuate recess 282 (see FIG. 12).

The meter unit 230 is mounted on the front fork 226 such that a lower surface of the cover member 276 faces obliquely forward (see FIG. 10). The headlight 210 is mounted on the front fork 226 so as to face in a forward direction. With the meter unit 230 and the headlight 210, which are mounted on the front fork 226 in this manner, the headlight 210 has a casing 210a, the upper portion (principally the base 290) of which enters the recess 282 and abuts against the lower surface of the cover member 276. Thus, the headlight 210 and the meter unit 230 are combined together to provide an integral appearance on a front upper portion of the two-wheeled motor vehicle 212.

The bridge 280 of the cover member 276 has a slot 284 defined therein, which extends perpendicularly to a direction along which the two meters 272, 274 are arrayed. With the headlight 210 and the meter unit 230 installed in position, one portion of the casing 210a of the headlight 210 enters the slot 284, whereas the other portion of the casing 210a abuts against a peripheral portion of the slot 284, so as to provide a passage (flow channel 286) which is surrounded by the slot 284 and the casing 210a (see FIG. 13). Operations and advantages of the flow channel 286 will be described later.

Figure 13:
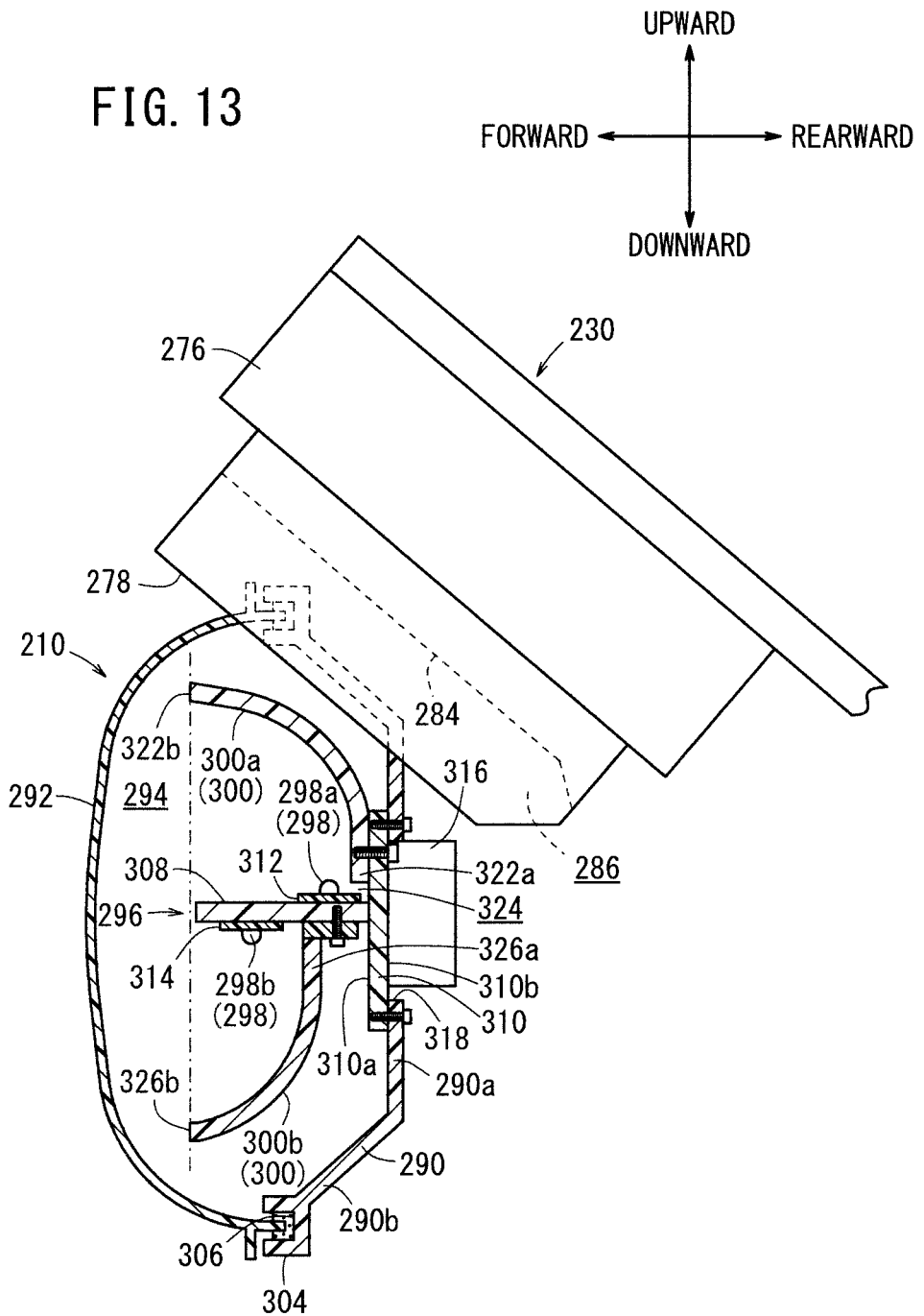
FIG. 13 is a cross-sectional view, partially in side elevation, showing the lighting device shown in FIG. 10 and the mounting structure for the lighting device.
Figure 14:
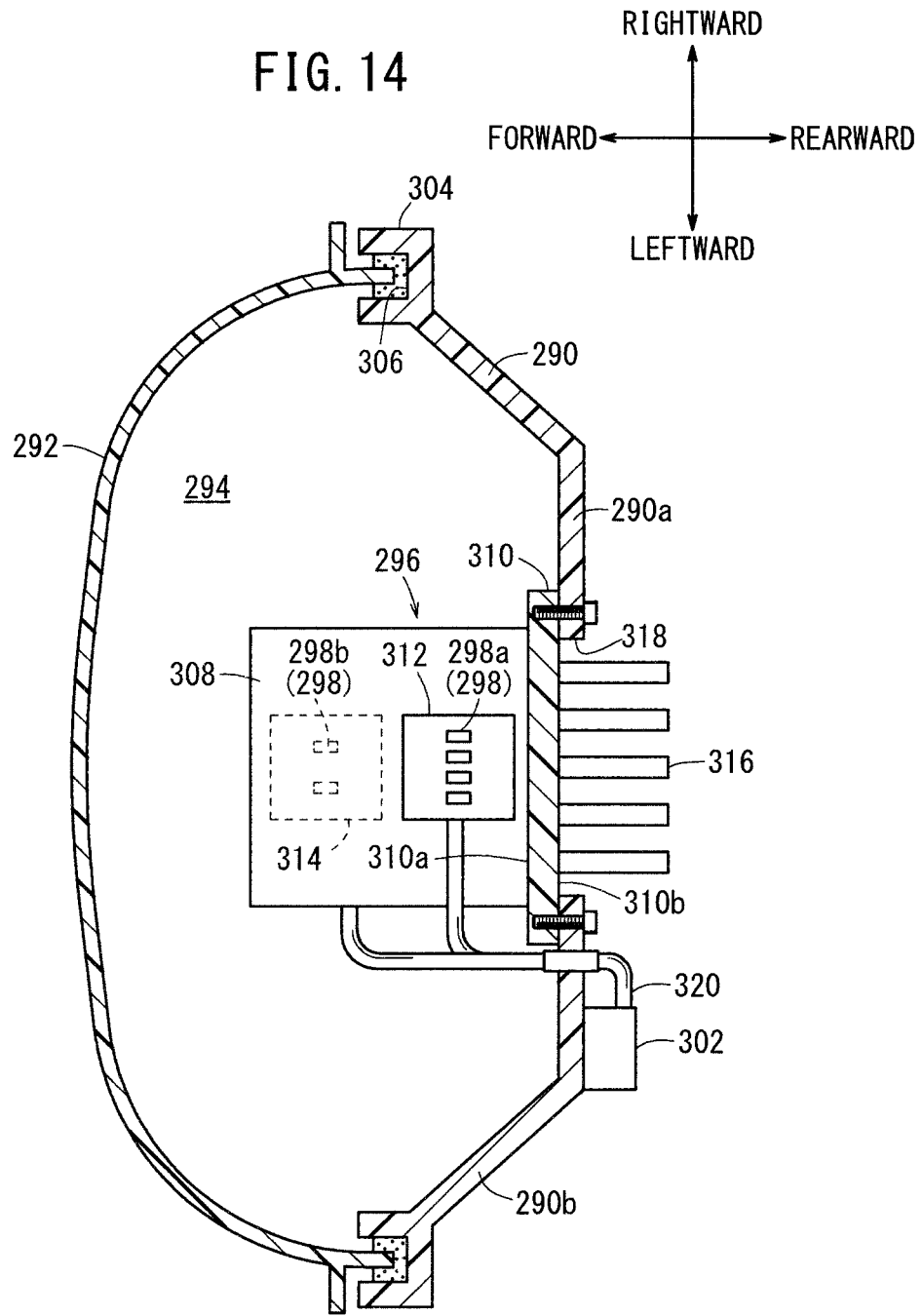
FIG. 14 is a cross-sectional view, partially in plan, showing the lighting device shown in FIG. 10 and the mounting structure for the lighting device.
Figure 15:
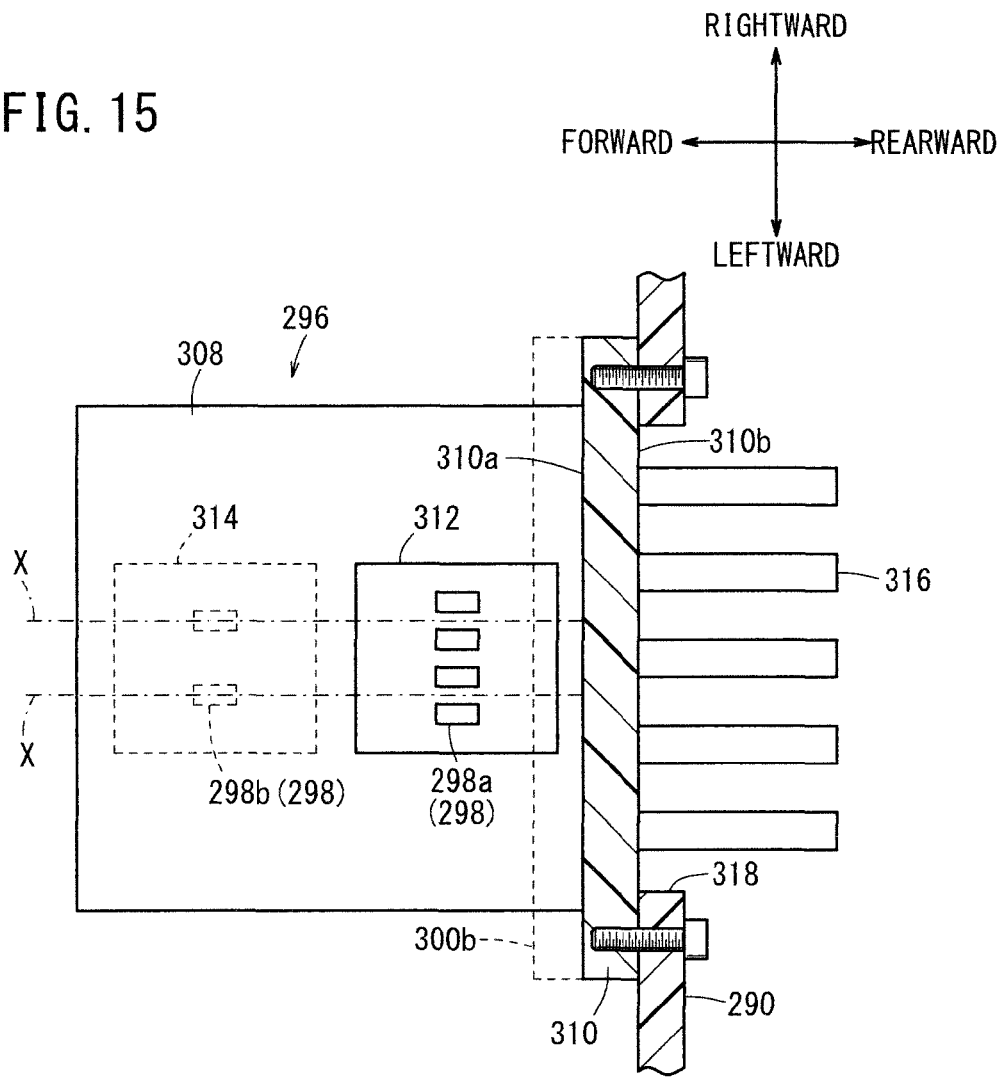
FIG. 15 is an enlarged cross-sectional view, partially in plan, showing a support assembly shown in FIG. 14 and components in the vicinity of the support assembly.

FIG. 13 is a cross-sectional view, partially in side elevation, showing the headlight 210 shown in FIG. 10 and the mounting structure for the lighting device. FIG. 14 is a cross-sectional view, partially in plan, showing the headlight 210 shown in FIG. 10 and the mounting structure for the lighting device. FIG. 15 is an enlarged cross-sectional view, partially in plan, showing a support assembly 296 shown in FIG. 14 and components in the vicinity of the support assembly 296. The headlight 210 according to the reference example includes the base 290 and a lens 292, which collectively make up the casing 210a. The base 290 and the lens 292 jointly define a space 294 therebetween, in which the support assembly 296, the light-emitting diodes (hereinafter referred to as "LEDs") 298, and a reflector 300 are housed.

The base 290 is shaped with an outer profile, which engages the cover member 276 of the meter unit 230. More specifically, the base 290 is circular in shape as viewed in front elevation (see FIG. 12). As viewed in sectional side elevation, the base 290 is substantially concave in cross section, wherein a side wall 290b of the base 290 spreads in a tapered fashion from a rear side wall 290a toward a front open end (see FIG. 13).

The base 290 is made of a synthetic resin, which can withstand a rise in temperature caused by light emitted by the LEDs 298. The synthetic resin preferably is a BMC (Bulk Molding Compound) or the like, for example.

A support assembly 296 (second support base plate 310) is fastened by screws to an inner surface of the rear side wall 290a of the base 290. A drive unit (drive circuit) 302 for controlling energization of the headlight 210 is mounted on an outer surface of the rear side wall 290a. The open front end of the base 290 has a flange 304, which projects outwardly from the base 290. The flange 304 includes a mounting groove 306 defined in a front face thereof, and which receives an open rear end of the lens 292.

The lens 292, which is made of a highly transparent synthetic resin, has a circular shape and engages with the base 290 as viewed in front elevation (see FIG. 12). The lens 292 also is substantially arcuate in shape as viewed in cross-sectional side elevation (see FIG. 13). The lens 292 is assembled on the base 290 with the rear open end of the lens 292 fitted in the mounting groove 306.

As shown in FIGS. 13 and 14, the light radiating components, i.e., the LEDs 298, the reflector 300, etc., which are housed in the headlight 210, are attached to the base 290 by the support assembly 296. The support assembly 296 includes a first support base plate 308 (first board support member) in the form of a flat plate, which extends in the space 294 in the longitudinal direction of the motor vehicle, a second support base plate 310 (second board support member), which is fastened to the base 290 by screws and extends in a vertical direction, an upper mounting board 312, which is disposed on an upper surface of the first support base plate 308, and a lower mounting board 314, which is disposed on a lower surface of the first support base plate 308. The support assembly 296 is made of a highly thermally conductive material.

The first support base plate 308 is coupled perpendicularly to the surface 310a of the second support base plate 310, which faces toward the space 294. The second support base plate 310 supports the first support base plate 308 so as to extend in the longitudinal direction of the motor vehicle. The first support base plate 308 extends substantially horizontally in the space 294 at a vertically intermediate position. The plural LEDs 298 are mounted via the upper mounting board 312 and the lower mounting board 314 at given positions on upper and lower surfaces of a flat plate that serves as the first support base plate 308.

A plurality of heat radiating plates (heat radiating fins 316, heat radiating means), each of which is in the form of a flat plate, are disposed on the surface 310b of the second support base plate 310, which is opposite to the surface 310a thereof that is coupled to the first support base plate 308. When the second support base plate 310 is installed on the base 290, the heat radiating fins 316 are inserted into a mounting opening 318, which is defined in the rear side wall 290a of the base 290. The heat radiating fins 316 project beyond an outer surface of the base 290. Consequently, the second support base plate 310 can easily be positioned on the base 290, thereby enabling efficient assembly of the headlight 210.

The first support base plate 308, the second support base plate 310, and the heat radiating fins 316 may be produced separately and thereafter coupled to each other. However, the first support base plate 308, the second support base plate 310, and the heat radiating fins 316 may also be integrally molded as an individual component, thereby enabling the number of parts of the headlight 210 to be reduced. In addition, in this manner, the headlight 210 can be manufactured with less cost and assembled more efficiently.

The LEDs 298, which are disposed on upper and lower surfaces of the first support base plate 308, comprise LEDs that are capable of emitting an amount of light at a color temperature suitable for use as a light source for the headlight 210. The LEDs 298 according to the reference example include low-beam LEDs 298a disposed on an upper surface of the first support base plate 308, and high-beam LEDs 298b disposed on a lower surface of the first support base plate 308. The low-beam LEDs 298a serve as a light source for irradiating a relatively wide zone positioned obliquely downward of the vehicle body, and the high-beam LEDs 298b serve as a light source for irradiating a relatively narrow zone positioned in front of the low beam. The low-beam LEDs 298a and the high-beam LEDs 298b may be LEDs of one type for thereby reducing the cost of the parts used. On the other hand, the low-beam LEDs 298a and the high-beam LEDs 298b may also be LEDs of different types. For example, the low-beam LEDs 298a and the high-beam LEDs 298b may be LEDs that emit different amounts of light.

A plurality (four in the reference example) of low-beam LEDs 298a are arrayed in the transverse direction of the motor vehicle on the upper surface of the first support base plate 308. The four low-beam LEDs 298a are disposed at given positions on the upper surface of the first support base plate 308 by the upper mounting board 312. The upper mounting board 312 is printed with a given electric circuit (not shown), the input and output terminals of which are connected to the drive unit 302 by a cable 320. The four low-beam LEDs 298a are connected in series in addition to being mounted on the upper mounting board 312. When the driver takes an action to emit a low beam, each of the low-beam LEDs 298a is supplied with electric power from the drive unit 302 to emit a predetermined amount of light.

A plurality (two in the reference example) of high-beam LEDs 298b are arrayed in the transverse direction of the motor vehicle on the lower surface of the first support base plate 308. The two high-beam LEDs 298b are disposed at given positions on the lower surface of the first support base plate 308 by the lower mounting board 314. A given electric circuit also is printed on the lower mounting board 314. The two high-beam LEDs 298b are connected in series in addition to being mounted on the lower mounting board 314. When the driver takes an action to emit a high beam, each of the high-beam LEDs 298b is supplied with electric power from the drive unit 302 to emit a predetermined amount of light.

The low-beam LEDs 298a are positioned more closely to the heat radiating fins 316 than the high-beam LEDs 298b. More specifically, as shown in FIGS. 14 and 15, when the first support base plate 308 is viewed in plan, the upper mounting board 312 is disposed in the vicinity of the second support base plate 310, and the lower mounting board 314 is disposed in front of the upper mounting board 312.

The layout of the four low-beam LEDs 298a and the two high-beam LEDs 298b will be described in more specific detail below. The four low-beam LEDs 298a are arrayed in the transverse direction of the motor vehicle behind the first support base plate 308 at equal distances from the heat radiating fins 316. The low-beam LEDs 298a are spaced with given intervals therebetween.

The two high-beam LEDs 298b are arrayed such that hypothetical straight lines X, which extend along minimum paths from the high-beam LEDs 298b toward the heat radiating fins 316, pass through gaps between the positions of the four low-beam LEDs 298a. The two high-beam LEDs 298b are arrayed in the transverse direction of the motor vehicle such that the high-beam LEDs 298b are positioned on the lower surface of the first support base plate 308 at equal distances from the heat radiating fins 316.

As described above, the headlight 210 has the four low-beam LEDs 298a and the two high-beam LEDs 298b, which are disposed in respective non-overlapping positions as viewed in plan (in the longitudinal and transverse directions of the motor vehicle). Operations and advantages of the layout of the low-beam LEDs 298a and the high-beam LEDs 298b will be described later.

Referring back to FIG. 13, the reflector 300 of the headlight 210 includes a low-beam reflector 300a, which reflects light emitted from the low-beam LEDs 298a, and a high-beam reflector 300b, which reflects light emitted from the high-beam LEDs 298b. The surface of the reflector 300 may be coated with a thin film of aluminum by way of evaporation.

A proximal end portion 322a of the low-beam reflector 300a is fastened by screws to the surface 310a of the second support base plate 310, which faces toward the space 294 and is disposed above the first support base plate 308. The low-beam reflector 300a is shaped as a curved surface, e.g., a quadric surface, for reflecting light emitted from the low-beam LEDs 298a as a low beam. The low-beam reflector 300a is mounted on the second support base plate 310 while leaving a gap 324 between the low-beam reflector 300a and the upper surface of the first support base plate 308. The upper mounting board 312 is disposed on the upper surface of the first support base plate 308, and has a rear portion that enters into the gap 324, thereby bringing the low-beam LEDs 298a closer to the heat radiating fins 316.

The high-beam reflector 300b is shaped as a curved surface, e.g., a quadric surface, for reflecting light emitted from the high-beam LEDs 298b as a high beam. The high-beam reflector 300*b* has a proximal end portion 326*a* fastened by screws to a lower surface of the first support base plate 308 in alignment with the upper mounting board 312. Therefore, the high-beam reflector 300*b* is positioned in front of the low-beam reflector 300*a*. As a result, the high-beam reflector 300*b* is capable of reflecting light emitted from the high-beam LEDs 298*b* at a position close to the high-beam LEDs 298*b*, thereby reducing loss of light.

With the reflector 300 according to the reference example, the low-beam reflector 300*a* has a front end 322*b* and the high-beam reflector 300*b* has a front end 326*b*. The respective front ends 322*b*, 326*b* project at substantially aligned positions. Therefore, the low-beam reflector 300*a* and the high-beam reflector 300*b* of the reflector 300 are visually perceived as having fan shapes, which are curved vertically and spread from the centers thereof in the transverse direction of the motor vehicle (see FIG. 12). More specifically, since the front ends 322*b*, 326*b* of the low-beam reflector 300*a* and the high-beam reflector 300*b* are aligned with each other, the reflector 300 is recognized visually as being symmetrical when viewed in front elevation, and hence, the reflector 300 has an improved appearance (aesthetic appearance). When the reflector 300 is viewed in side elevation, the reflector provides a lens surface, which is free of vertical protrusions.

Figure 16:
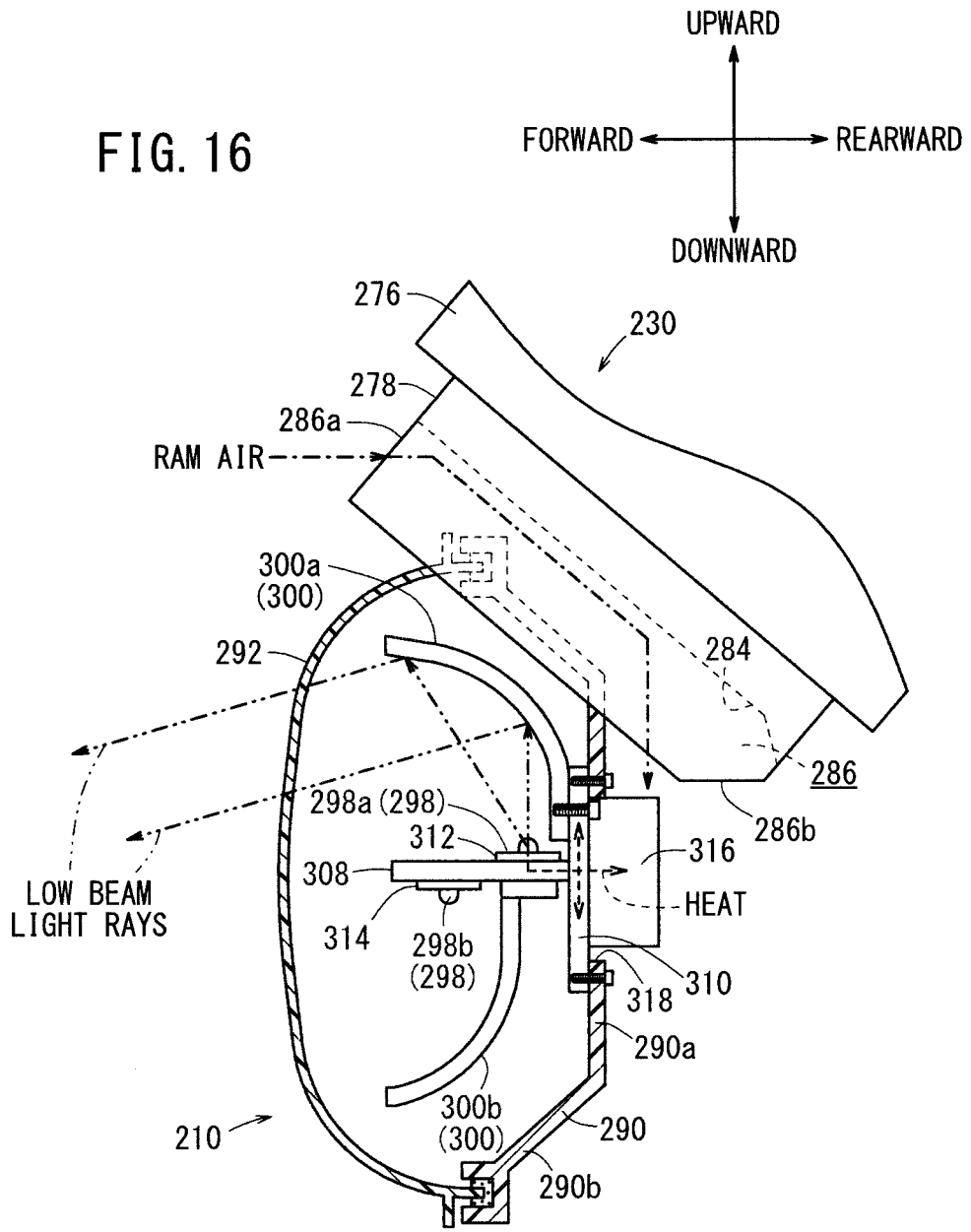
FIG. 16 is a cross-sectional view, partially in side elevation, showing the manner in which the lighting device shown in FIG. 13 operates to radiate a high beam.
Figure 17:
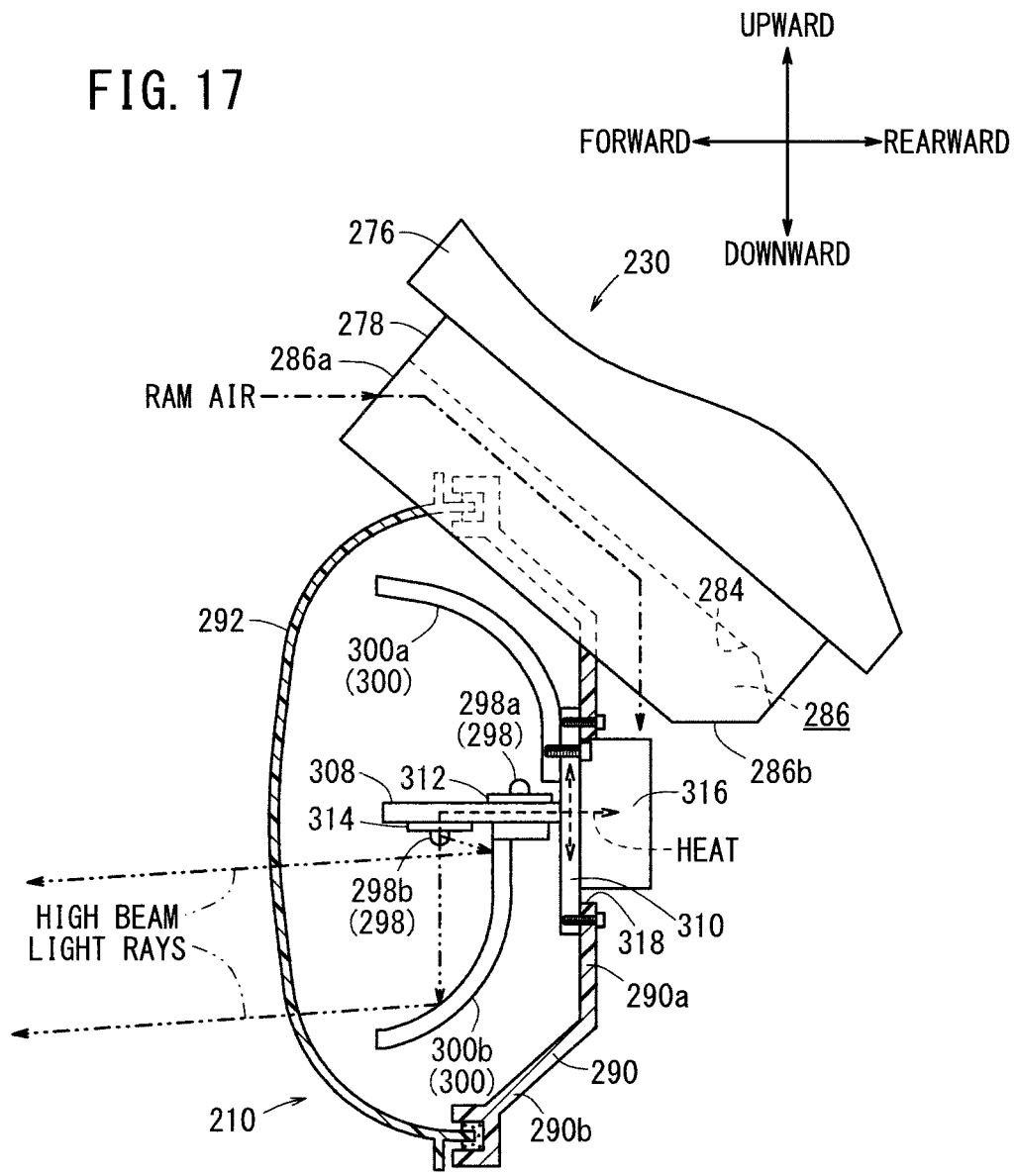
FIG. 17 is a cross-sectional view, partially in side elevation, showing the manner in which the lighting device shown in FIG. 13 operates to radiate a low beam.

The headlight 210 according to the reference example and the mounting structure for the headlight 210 are basically constructed as described above. Operations and advantages of the headlight 210 will be described below. FIG. 16 is a cross-sectional view, partially in side elevation, showing the manner in which the headlight 210 shown in FIG. 13 operates to radiate a high beam, and FIG. 17 is a cross-sectional view, partially in side elevation, showing the manner in which the headlight 210 shown in FIG. 13 operates to radiate a low beam.

When the driver takes an action to emit a low beam, the drive unit 302 (see FIG. 14) is controlled to energize the four low-beam LEDs 298*a* to emit a given amount of light. The low-beam LEDs 298*a* may be energized at all times. As shown in FIG. 16, the low-beam LEDs 298*a* emit rays of light upwardly or obliquely upward based on the angle of orientation thereof. The low-beam reflector 300*a*, which is disposed in an upper portion of the space 294, reflects via the reflecting surface (curved surface) thereof the rays of light emitted from the low-beam LEDs 298*a* in a prescribed direction. In this manner, the headlight 210 provides a low-beam light distribution obliquely downward in front of the vehicle body.

As described above, the four low-beam LEDs 298*a* are arrayed in the transverse direction of the motor vehicle on the first support base plate 308 (see FIG. 15). Therefore, the four low-beam LEDs 298*a* emit light, which is spread in the transverse direction of the motor vehicle, and a low beam, which is reflected by the low-beam reflector 300*a*, is radiated obliquely downward while spreading in the transverse direction (lateral direction) of the motor vehicle. More specifically, by way of the low-beam LEDs 298*a*, which are arrayed in the transverse direction of the motor vehicle, and the low-beam reflector 300*a*, the headlight 210 is capable of brightly irradiating a relatively wide zone that is present obliquely downward of the vehicle body.

When the driver takes an action to emit a high beam, the drive unit 302 (see FIG. 14) is controlled to energize the two high-beam LEDs 298*b* in order to emit a given amount of light. The high-beam LEDs 298*b* are not energized at all times. As shown in FIG. 17, the high-beam LEDs 298*b* emit light toward the high-beam reflector 300*b* based on the angle of orientation thereof. The high-beam reflector 300*b*, which is disposed in a lower portion of the space 294, reflects, by way of the reflecting surface (curved surface), the rays of light emitted from the high-beam LEDs 298*b* in a prescribed direction, thereby providing a high-beam light distribution. In this manner, the headlight 210 is capable of radiating a high beam as a light spot, which is positioned in front of the low beam.

As described above, by way of the four low-beam LEDs 298*a* and the low-beam reflector 300*a*, the headlight 210 according to the reference example is capable of providing a sufficiently bright distribution of low-beam light in a wide zone, and also is capable of providing a distribution of high-beam light as a light spot by way of the two high-beam LEDs 298*b* and the high-beam reflector 300*b*.

As shown in FIG. 16, since the low-beam LEDs 298*a* are supported on the first and second support base plates 308, 310 by the upper mounting board 312, heat that is generated when the low-beam LEDs 298*a* emit light is easily transmitted to the second support base plate 310 through the upper mounting board 312 and the first support base plate 308. Similarly, since the high-beam LEDs 298*b* are supported on the first and second support base plates 308, 310 by the lower mounting board 314, heat that is generated when the high-beam LEDs 298*b* emit light is easily transmitted to the second support base plate 310 through the lower mounting board 314 and the first support base plate 308 (see FIG. 17).

As shown in FIGS. 16 and 17, the heat radiating fins 316, which are disposed on the surface 310*b* of the second support base plate 310, are capable of easily radiating heat that is transferred to the second support base plate 310. As a result, the operational characteristics of the LEDs 298 are stabilized for enabling the low beam and the high beam to be radiated in a stable manner.

The low-beam LEDs 298*a* are positioned more closely to the heat radiating fins 316 than the high-beam LEDs 298*b*, so that heat generated by the low-beam LEDs 298*a*, which are energized more frequently than the high-beam LEDs 298*b*, i.e., which are energized at all times, can be radiated efficiently. Since the low-beam LEDs 298*a* and the high-beam LEDs 298*b* are disposed in respective non-overlapping positions, heat generated by the low-beam LEDs 298*a* and the high-beam LEDs 298*b* is prevented from being concentrated on a portion of the first support base plate 308, and hence the first support base plate 308, etc., is prevented from becoming deformed. Furthermore, the low-beam LEDs 298*a* and the high-beam LEDs 298*b* are less likely to thermally affect each other.

As described above, the low-beam LEDs 298*a* are disposed in the vicinity of the second support base plate 310, with a portion of the upper mounting board 312 entering into the gap 324 between the first support base plate 308 and the low-beam reflector 300*a*. Therefore, the distance from the low-beam LEDs 298*a* to the second support base plate 310 is reduced for promoting transfer of heat. As a consequence, the efficiency at which the heat generated when the low-beam LEDs 298*a* are turned on is radiated is increased. Furthermore, since the first support base plate 308 can be made shorter in the longitudinal direction of the motor vehicle, the headlight 210 can be reduced in size.

In addition, since the four low-beam LEDs 298*a* are arrayed in the transverse direction of the motor vehicle, distances from the low-beam LEDs 298*a* to the heat radiating fins 316 are uniformly reduced for thereby increasing the heat radiating efficiency.

As shown in FIG. 15, the hypothetical straight lines X, which extend along minimum paths from the high-beam LEDs 298*b* to the heat radiating fins 316, pass through gaps between the positions of the four low-beam LEDs 298*a*. Consequently, the low-beam LEDs 298*a* and the high-beam LEDs 298b can be spaced from each other without overlapping in the longitudinal and transverse directions of the motor vehicle, so that the low-beam LEDs 298a and the high-beam LEDs 298b are less likely to thermally affect each other.

The two high-beam LEDs 298b are spaced at equal distances from the heat radiating fins 316, and are arrayed in the transverse direction of the motor vehicle. Therefore, heat can easily be transferred from the high-beam LEDs 298b to the heat radiating fins 316 for thereby increasing the heat radiating efficiency.

As shown in FIGS. 16 and 17, the flow channel 286, which is defined by the slot 284 and the casing 210a, is disposed in an upper portion of the headlight 210. The flow channel 286 extents in an oblique vertical direction along the lower surface of the cover member 276, and has an opening 286a defined in front of the meter unit 230 and above the headlight 210, and another opening 286b defined below the meter unit 230 and behind the headlight 210.

With the headlight 210 and the meter unit 230 both being mounted on the front fork 226, the heat radiating fins 316 are disposed below the flow channel 286 (opening 286b). During running of the two-wheeled motor vehicle 212, the flow channel 286 introduces ram air from the front region (opening 286a), and guides the ram air downwardly (through the opening 286b) to the heat radiating fins 316, which are positioned below the meter unit 230.

Therefore, the heat radiating fins 316 are cooled by ram air, which is introduced when the two-wheeled motor vehicle 212 runs, whereby the heat radiating fins 316 easily radiate the heat that is generated when the LEDs 298 emit light. Inasmuch as the heat radiating fins 316 are mounted on the second support base plate 310, which serve as vertically extending heat radiating plates, the heat radiating fins 316 can easily guide the ram air that has been delivered from the flow channel 286 downwardly from above. Consequently, the efficiency at which heat is radiated by way of the heat radiating fins 316 is increased.

The headlight 210 according to the reference example and the mounting structure for the headlight 210 are not limited to the above arrangement, but may employ various alternative arrangements. For example, the low-beam LEDs 298a and the high-beam LEDs 298b may be mounted directly on the support assembly 296, rather than via the upper mounting board 312 and the lower mounting board 314, for enabling smoother transfer of heat.

According to the reference example, the low-beam LEDs 298a and the high-beam LEDs 298b are arrayed in the transverse direction of the motor vehicle. However, the low-beam LEDs 298a and the high-beam LEDs 298b may also be arrayed in the longitudinal direction of the motor vehicle.

Seventh Embodiment

Figure 18:
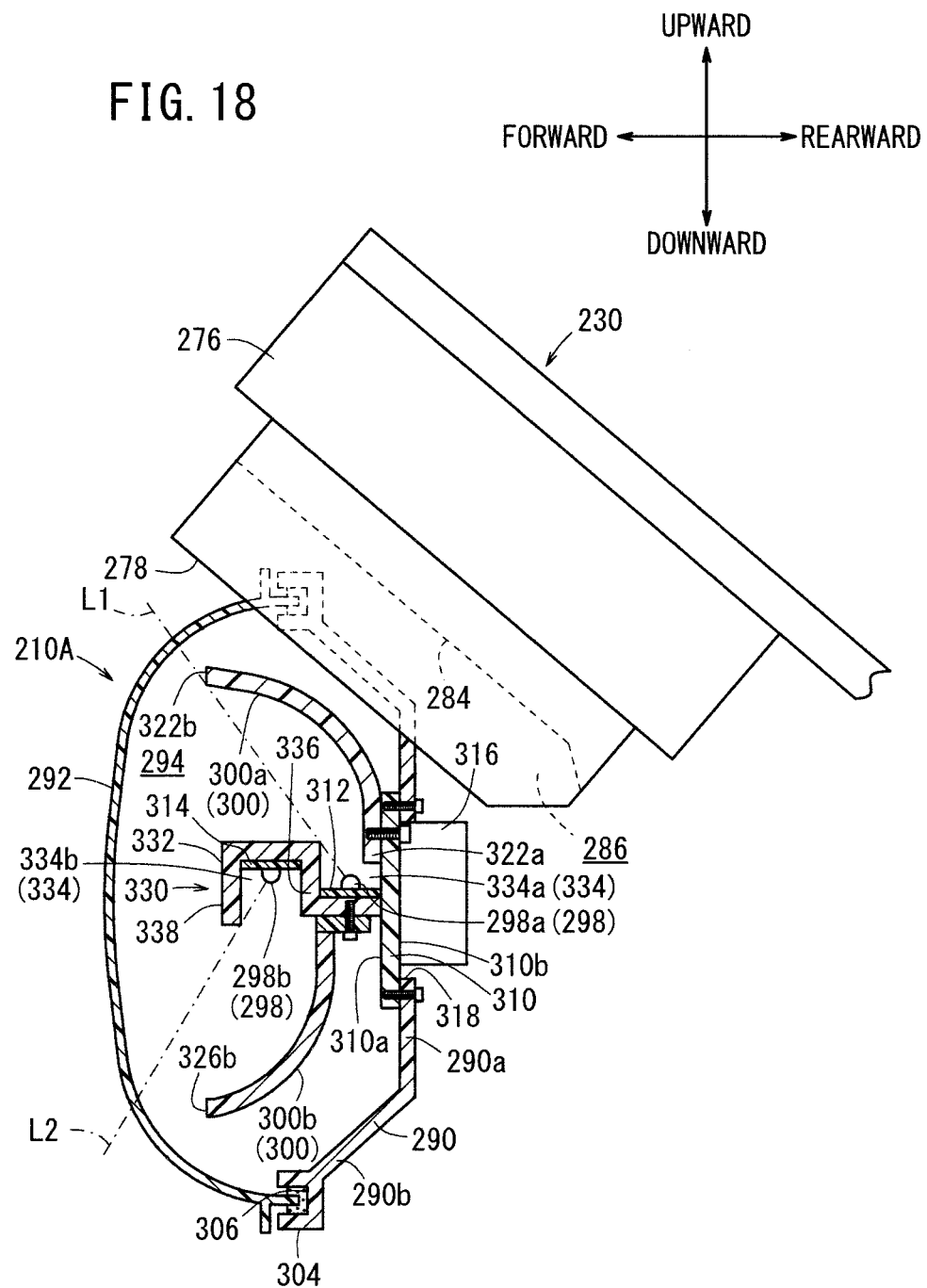
FIG. 18 is a cross-sectional view, partially in side elevation, showing a lighting device according to a seventh embodiment and a mounting structure for the lighting device.

A headlight 210A according to a seventh embodiment will be described below. FIG. 18 is a cross-sectional view, partially in side elevation, showing the headlight 210A according to the seventh embodiment and a mounting structure for the headlight 210A. In the subsequent description of the seventh embodiment, parts which are identical in structure and function to those of the headlight 210 according to the reference example will be denoted by identical reference characters, and such features will not be described in detail below.

The headlight 210A according to the seventh embodiment differs from the headlights 10, 10A through 10E according to the first through sixth embodiments and the headlight 210 according to the reference example, in that a first support base plate 332 (support member 330) has two cavities 334 (first cavity 334a, second cavity 334b) defined therein.

The first cavity 334a is defined in an upper surface of the first support base plate 332 in proximity to the second support base plate 310. The second cavity 334b is defined in a lower surface of the first support base plate 332 in front of the first cavity 334a. When the first support base plate 332 is viewed in sectional side elevation, the first cavity 334a, which opens upwardly, and the second cavity 334b, which opens downwardly, are juxtaposed in the longitudinal direction of the motor vehicle. An intermediate wall 336, which is disposed between the two cavities 334a, 334b, serves as one common wall of the cavities 334a, 334b.

The low-beam LEDs 298a are mounted in the first cavity 334a by the upper mounting board 312, whereas the high-beam LEDs 298b are mounted in the second cavity 334b by the lower mounting board 314.

More specifically, the low-beam LEDs 298a, which are housed in the first cavity 334a, are prevented from being seen by an observer when the observer views the headlight 210A from the front. An angle of a hypothetical straight line L1, which defines the visual perception prevention range for the low-beam LEDs 298a, is determined by a front wall (intermediate wall 336) of the first cavity 334a in which the low-beam LEDs 298a are disposed.

In particular, since the low-beam LEDs 298a, which serve as the light source, are oriented in an upward direction, the shaped of the intermediate wall 336 (first cavity 334a) or the low-beam reflector 330a should be designed to make the hypothetical straight line L1 cross the front end 322b of the low-beam reflector 300a. With such a shape, when an observer sees the headlight 210A from a vertical direction, the observer is prevented from seeing the low-beam LEDs 298a by the intermediate wall 336 and the low-beam reflector 300a, while direct light from the low-beam LEDs 298a also is blocked by the intermediate wall 336 and the low-beam reflector 300a.

Since the high-beam LEDs 298b are housed in the second cavity 334b, the high-beam LEDs 298b are prevented from being seen by an observer when the observer sees the headlight 210A from the front. An angle of a hypothetical straight line L2, which defines the visual perception prevention range for the high-beam LEDs 298b, is determined by a front wall (distal-end wall 338) of the second cavity 334b in which the high-beam LEDs 298b are disposed.

The high-beam LEDs 298b, which serve as the light source, are oriented in a downward direction where the front wheel 214 (see FIG. 10) is disposed. Therefore, the distal-end wall 338 may be set at an appropriate height, which makes the high-beam LEDs 298b less likely to be seen. Thus, the observer is prevented from seeing the high-beam LEDs 298b as well as direct light emitted from the high-beam LEDs 298b.

The support member 330 according to the seventh embodiment is capable of easily transferring heat, which is generated when the low-beam LEDs 298a or the high-beam LEDs 298b emit light, to the second support base plate 310, so that such heat can be radiated from the heat radiating fins 316 on the rear side of the second support base plate 310.

Figure 19:
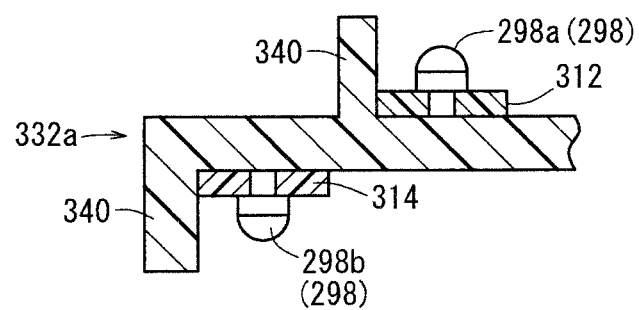
FIG. 19 is a cross-sectional view, partially in side elevation, showing a modification of a first support base plate shown in FIG. 18.

FIG. 19 is a cross-sectional view, partially in side elevation, showing a modification of the first support base plate 332 shown in FIG. 18. The headlight 210A has a first support base plate 332a, which is free of the cavities 334, but has walls 340 that project in front of positions where the low-beam LEDs 298a and the high-beam LEDs 298b are disposed. The walls 340 conceal the low-beam LEDs 298a and the high-beam LEDs 298b from view, thereby preventing an observer from seeing the LEDs 298a, 298b as well as direct light from the LEDs 298a, 298b.

The present invention is not limited to the above embodiments, but may employ various arrangements without departing from the scope of the invention.

The invention claimed is:

1. A lighting device for a vehicle, comprising a base surrounded along an outer periphery thereof by a cover member of a vehicle body, a lens mounted on a front portion of the base and which is exposed through an opening defined in the cover member, and a light-emitting diode and a reflector, which are housed in a space defined by the base and the lens, wherein:

the light-emitting diode is disposed in a predetermined position on a support assembly, which is supported on the base and extends into the space; and a wall is integrally formed with the support assembly and positioned forwardly of and in proximity to the predetermined position in which the light-emitting diode of the support assembly is disposed, the wall being disposed higher than the light-emitting diode, for limiting light that is emitted directly from the light-emitting diode.

2. The lighting device according to claim 1, wherein:

the support assembly includes a cavity that houses the light-emitting diode therein; and the wall comprises a portion of an inner wall, which surrounds a peripheral side portion of the light-emitting diode in the cavity.

3. The lighting device according to claim 1, wherein:

the base supports the light-emitting diode together with the support assembly in a downwardly facing manner, the reflector being disposed in a position confronting the light-emitting diode; and the wall being disposed at a height, such that a hypothetical straight line, which interconnects a center of the light-emitting diode and a tip end of the wall, passes through a front lower portion of the lens.

4. The lighting device according to claim 3, wherein the reflector is curved from an upper end toward a lower end thereof, the lower end crossing the hypothetical straight line.

5. The lighting device according to claim 1, wherein:

the support assembly comprises a board on which the light-emitting diode is mounted, and a board support that supports the board; and the board support is made of a thermally conductive material, and is mounted on the base such that the board support supports the board on one surface thereof, and has another surface, which is opposite to the one surface, exposed through a mounting opening defined in the base.

6. A mounting structure for a lighting device for a vehicle, the lighting device comprising a base surrounded along an outer periphery thereof by a cover member of a vehicle body, a lens mounted on a front portion of the base and which is exposed through an opening defined in the cover member, and a light-emitting diode and a reflector, which are housed in a space defined by the base and the lens, wherein:

the light-emitting diode is disposed in a predetermined position on a support assembly, which is supported on the base and extends into the space; and the support assembly includes a wall positioned forwardly of and in proximity to the predetermined position in which the light-emitting diode is disposed, the wall being disposed higher than the light-emitting diode, for limiting light that is emitted directly from the light-emitting diode, and wherein the cover member covers a portion of the lens, so as to conceal the light-emitting diode and the support assembly when the lighting device is viewed from the front.

7. The mounting structure for the lighting device according to claim 6, wherein the base is disposed within the cover member, such that a surface of the support assembly on which the light-emitting diode is disposed faces obliquely rearward.

8. The mounting structure for the lighting device according to claim 6, wherein the opening is shaped so as to be inclined obliquely upward in an outer transverse direction of the vehicle body; and the base supports the reflector and the support assembly, so as to be inclined obliquely upward in the outer transverse direction of the vehicle body, and at an angle of inclination of an upper end of the opening.

9. A mounting structure for a lighting device for a vehicle, the lighting device comprising a base surrounded along an outer periphery thereof by a cover member of a vehicle body, a lens mounted on a front portion of the base and which is exposed through an opening defined in the cover member, and a light-emitting diode and a reflector, which are housed in a space defined by the base and the lens, wherein:

the light-emitting diode is disposed in a predetermined position on a support assembly, which is supported on the base and extends into the space; and the support assembly includes a wall positioned forwardly of and in proximity to the predetermined position in which the light-emitting diode is disposed, the wall being disposed higher than the light-emitting diode, for limiting light that is emitted directly from the light-emitting diode, wherein:

the support assembly comprises a board on which the light-emitting diode is mounted, and a board support that supports the board; and the board support is made of a thermally conductive material, and is mounted on the base such that the board support supports the board on one surface thereof, and has another surface, which is opposite to the one surface, exposed through a mounting opening defined in the base, and wherein:

heat radiating fins, which are exposed outside of the space, are disposed on the other surface of the board support; and the cover member includes a duct defined therein for guiding ram air that flows toward the heat radiating fins.

* * * * *